US012794261B2

(12) United States Patent
Masuda et al.

(10) Patent No.: US 12,794,261 B2

(45) Date of Patent: Nov. 10, 2026

(54) ON-BOARD BACKUP CONTROL APPARATUS

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Kazuki Masuda, Yokkaichi (JP); Takeshi Hasegawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 18/998,660

(22) PCT Filed: Jul. 29, 2022

(86) PCT No.: PCT/JP2022/029302

§ 371 (c)(1),
(2) Date: Jan. 27, 2025

(87) PCT Pub. No.: WO2024/024087

PCT Pub. Date: Feb. 1, 2024

(65) Prior Publication Data

US 2026/0045823 A1 Feb. 12, 2026

(51) Int. Cl.

*H02J 9/06* (2006.01)
*B60L 3/00* (2019.01)

(Continued)

(52) U.S. Cl.

CPC ............ *H02J 9/068* (2020.01); *B60L 3/0092* (2013.01); *H02J 7/855* (2026.01); *H02J 7/96* (2026.01);

(Continued)

(58) Field of Classification Search

CPC .... H02J 9/068; H02J 7/0063; H02J 7/007182; H02J 2207/20; B60L 3/0092; B60L 2240/547

See application file for complete search history.

(56) References Cited

U.S. PATENT DOCUMENTS

2017/0349048 A1* 12/2017 Nakayama ................ B60L 3/04
2021/0336475 A1* 10/2021 Navarro .................. H02J 9/062

FOREIGN PATENT DOCUMENTS

DE 102019108399 B4 * 3/2025 ................ H02J 7/50
EP 3709479 A1 * 9/2020 .............. H02J 1/102

(Continued)

OTHER PUBLICATIONS

International Search Report, Application No. PCT/JP2022/029302, mailed Sep. 6, 2022. ISA/Japan Patent Office.

*Primary Examiner* — Daniel Cavallari
(74) *Attorney, Agent, or Firm* — Brooks Kushman P.C.

(57) ABSTRACT

An on-board backup control apparatus includes: a first supply circuit that can output power based on a first power storage portion to a load via a first conductive path; a second supply circuit that can output power based on a second power storage portion to a load via a second conductive path; and a first control unit and a second control unit that cause the first supply circuit and the second supply circuit to perform a backup operation during an external state. During the external state, the first control unit and the second control unit execute predetermined prioritizing control for prioritizing a first backup operation of supplying power based on the second power storage portion to the load over a second (Continued)

backup operation of supplying power based on the second power storage portion to the load.

13 Claims, 11 Drawing Sheets

(51) Int. Cl.
*H02J 7/00* (2006.01)
*H02J 7/96* (2026.01)

(52) U.S. Cl.
CPC ..... *B60L 2240/547* (2013.01); *H02J 2207/20* (2020.01)

(56) References Cited

FOREIGN PATENT DOCUMENTS

| | | | |
|---|---|---|---|
| JP | 2009-296808 | A | 12/2009 |
| JP | 2015-070746 | A | 4/2015 |
| JP | 2018-191440 | A | 11/2018 |

* cited by examiner

ON-BOARD BACKUP CONTROL APPARATUS

CROSS-REFERENCE TO RELATED APPLICATIONS

This application is the U.S. national stage of PCT/JP2022/029302 filed on Jul. 29, 2022, the contents of which are incorporated herein.

TECHNICAL FIELD

The present disclosure relates to an on-board backup control apparatus.

BACKGROUND

JP 2009-296808A discloses a power storage apparatus that supplies power to a load from a power storage portion when the voltage of a main power supply drops. When the main power supply is in a normal state, a control circuit of this power storage apparatus controls a charge circuit and causes the charge circuit to charge the power storage portion. Furthermore, when the voltage of the main power supply drops (for example, when the engine is started after idling stop ends), this control circuit supplies power to the load by turning on a switch disposed between the power storage portion and the load. Furthermore, J P 2009-296808A indicates that this power storage apparatus is also applicable to a system for supplying backup power during an abnormality of the main power supply.

The power storage apparatus of JP 2009-296808A has a configuration in which one power storage portion supplies power to a load to which backup power is to be supplied. However, with such a configuration, the method for supplying power would be limited because only one power source supplies power to the load during backup.

The present disclosure aims to make it possible to prioritize the backup operation with respect to the first load in the supply of backup power to first and second loads using a second power storage portion while combining an operation in which a first power storage portion is used and an operation in which the second power storage portion is used to supply backup power to a common load.

SUMMARY

An on-board backup control apparatus that is one aspect of the present disclosure is an on-board backup control apparatus for use in an on-board power supply system that includes a power supply unit and power storage portions, the on-board backup control apparatus performing a backup operation of supplying power to loads based on power from the power storage portions during a predetermined external state in which power supply from the power supply unit to the loads has been interrupted or has decreased, the on-board backup control apparatus including a first supply circuit that can output, to a common load via a first conductive path, power based on a first power storage portion that is one of the power storage portions, a second supply circuit that can output, to the common load via a second conductive path, power based on a second power storage portion that is one of the power storage portions; and a control unit that causes the first and second supply circuits to perform the backup operation during the external state, wherein the second supply circuit supplies power based on the second power storage portion to at least one first load and at least one second load, and during the external state, the control unit executes predetermined prioritizing control for prioritizing a first backup operation of supplying power based on the second power storage portion to the first load over a second backup operation of supplying power based on the second power storage portion to the second load.

Advantageous Effects

The technique according to the present disclosure makes it possible to prioritize the backup operation with respect to the first load in the supply of backup power to first and second loads using a second power storage portion while combining an operation in which a first power storage portion is used and an operation in which the second power storage portion is used to supply backup power to a common load.

DETAILED DESCRIPTION OF PREFERRED EMBODIMENTS

Figure 1:
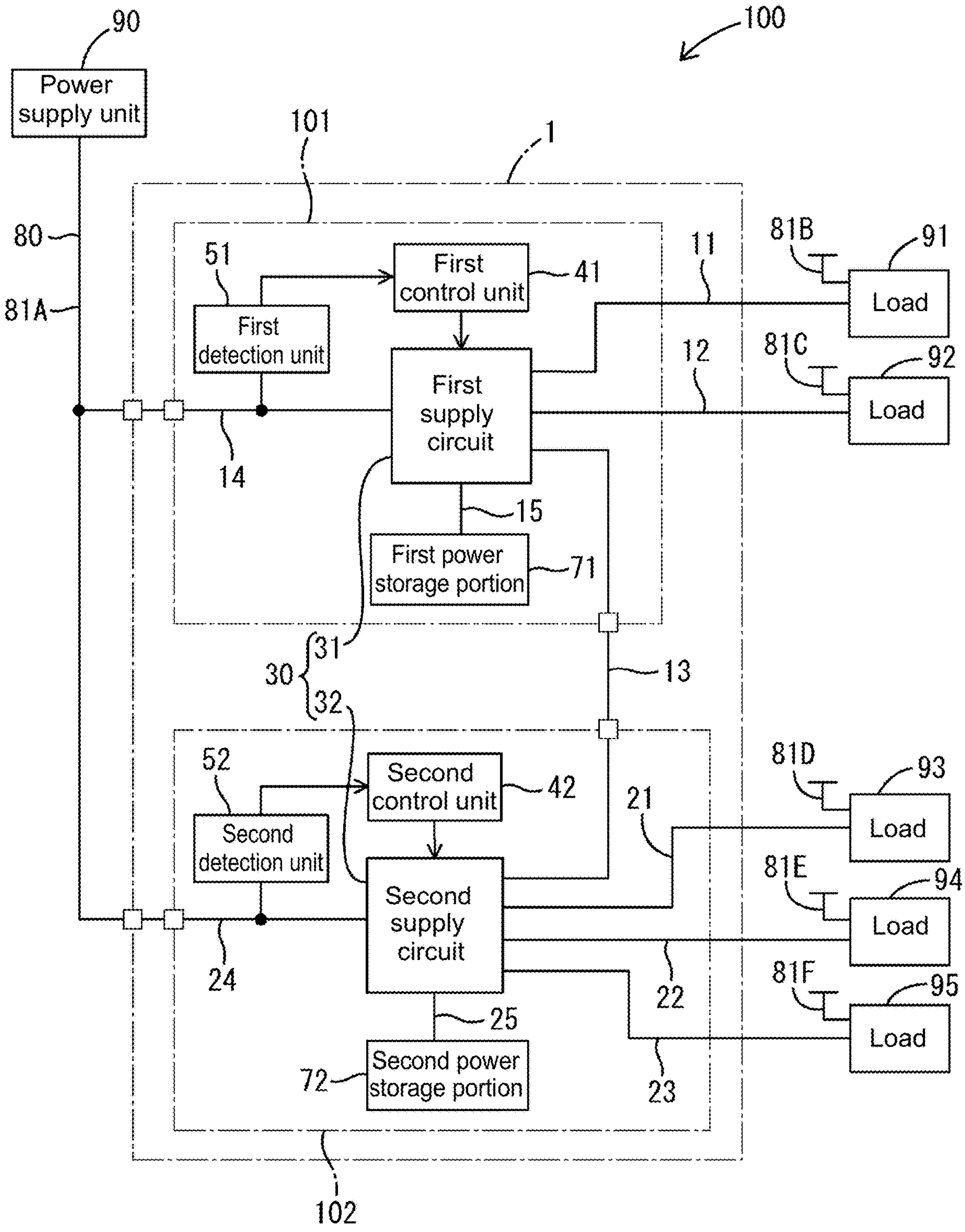
FIG. 1 is a block diagram schematically illustrating an example of an on-board power supply system including an on-board backup control apparatus in a first embodiment.

Example embodiments of the present disclosure are listed and described below. Note that example features described below may be combined in any way as long as they are not contradictory.

In a first aspect, an on-board backup control apparatus for use in an on-board power supply system that includes a power supply unit and power storage portions, the on-board backup control apparatus performing a backup operation of supplying power to loads based on power from the power storage portions during a predetermined external state in which power supply from the power supply unit to the loads has been interrupted or has decreased, the on-board backup control apparatus including a first supply circuit that can output, to a common load via a first conductive path, power based on a first power storage portion that is one of the power storage portions; a second supply circuit that can output, to the common load via a second conductive path, power based on a second power storage portion that is one of the power storage portions; and a control unit that causes the first and second supply circuits to perform the backup operation during the external state, wherein the second supply circuit supplies power based on the second power storage portion to at least one first load and at least one second load, and during the external state, the control unit executes predetermined prioritizing control for prioritizing a first backup operation of supplying power based on the second power storage portion to the first load over a second backup operation of supplying power based on the second power storage portion to the second load.

The on-board backup control apparatus in the first aspect can perform a backup operation in which power storage portions are used during a predetermined external state in which power supply from a power supply unit has been interrupted or has decreased. According to this backup control apparatus, power can be supplied to a predetermined common load from first and second power storage portions. Thus, during the backup operation, the backup control apparatus can combine an operation in which power is supplied to the common load from the first power storage portion and an operation in which power is supplied to the common load from the second power storage portion. In addition to this, by predetermined prioritizing control being executed by a control unit, a first backup operation (operation in which power based on the second power storage portion is supplied to a first load) can be prioritized over a second backup operation (operation in which power based on the second power storage portion is supplied to a second load).

In a second aspect, the on-board backup control apparatus according to the first aspect, including the following feature(s). A third conductive path which is a path for outputting power to the common load and to which power is supplied from the first and second conductive paths is included. The first supply circuit includes a first switching element that is provided on the first conductive path, the first switching element allowing current to flow from the first-power-storage-portion side to the third-conductive-path side in an on state and interrupting the flow of current from the first-power-storage-portion side to the third-conductive-path side in an off state. The second supply circuit includes a second switching element that is provided on the second conductive path, the second switching element allowing current to flow from the second-power-storage-portion side to the third-conductive-path side in an on state and interrupting the flow of current from the second-power-storage-portion side to the third-conductive-path side in an off state. The control unit includes a first control unit and a second control unit that respectively control the first supply circuit and the second supply circuit. The first and second control units are configured to be capable of mutually communicating. During the second backup operation, a voltage based on the second power storage portion is applied to the third conductive path via the second conductive path by the second control unit placing the second switching element in the on state while the first control unit places the first switching element in the off state, and, during the first backup operation, a voltage based on the first power storage portion is applied to the third conductive path via the first conductive path by the second control unit placing the second switching element in the off state while the first control unit places the first switching element in the on state.

According to the on-board backup control apparatus in the second aspect, a first switching element and a second switching element can be switched between on and off states by being respectively controlled by a first control unit and a second control unit that are capable of mutually communicating. Thus, the first and second switching elements can be placed in the on state selectively. Due to this, switching between the first and second backup operations can be successfully effectively at desired timings.

In a third aspect, the on-board backup control apparatus according to the first aspect, including the following feature(s). A third conductive path which is a path for outputting power to the common load and to which power is supplied from the second conductive path, and a diode that is provided between the first and third conductive paths, an anode and a cathode of the diode being electrically connected to the first-conductive-path side and the third-conductive-path side, respectively, are included. The first supply circuit includes a first conversion unit that boosts or steps-down an input voltage that is based on power from the first power storage portion and applies an output voltage to the first conductive path. The second supply circuit includes a second conversion unit that boosts or steps-down an input voltage that is based on power from the second power storage portion and applies an output voltage to the second conductive path. During the prioritizing control, the control unit controls output to the first conductive path by the first conversion unit and output to the second conductive path by the second conversion unit so that power based on the second power storage portion is supplied to the third conductive path via the second conductive path and power based on the first power storage portion is interrupted by the diode.

According to the on-board backup control apparatus in the third aspect, power based on the second power storage portion can be supplied to a third conductive path via the second conductive path during the prioritizing control by the control unit. Because power based on the first power storage portion is interrupted by a diode in a state in which an output voltage is applied to the first conductive path by the first conversion unit, a state for preparing for the supply of backup power to the common load can be established while suppressing consumption of power based on the first power storage portion. Upon switching from a state in which power based on the second power storage portion is supplied to the third conductive path to a state in which power based on the first power storage portion is supplied to the third conductive path, power based on the first power storage portion can be supplied immediately to the third conductive path via the diode. Thus, an interruption of power supply to the common load can be prevented from occurring during a switch between power sources.

In a fourth aspect, the on-board backup control apparatus according to the third aspect, including the following feature(s). A first voltage detection unit that detects a voltage of the first conductive path and a second voltage detection unit that detects a voltage of the third conductive path are included. During the prioritizing control, the control unit controls the first conversion unit so that a voltage based on the first power storage portion is applied to the first conductive path, controls the second conversion unit so that a voltage based on the second power storage portion is applied to the third conductive path, and controls the first and second conversion units based on voltage detection results by the first and second voltage detection units so that the voltage of the third conductive path is maintained at a voltage at which current flow from the first conductive path to the third conductive path is interrupted.

According to the on-board backup control apparatus in the fourth aspect, the first and second conversion units can be controlled based on voltage detection results by first and second voltage detection units during the prioritizing control by the control unit. Thus, a voltage applied to the first conductive path based on power from the first power storage portion and a voltage applied to the second conductive path based on power from the second power storage portion can be controlled directly.

In a fifth aspect, the on-board backup control apparatus according to the third aspect, including the following feature(s). A current detection unit that detects current flowing in the first conductive path is included. During the prioritizing control, the control unit controls the first conversion unit so that a voltage based on the first power storage portion is applied to the first conductive path, controls the second conversion unit so that a voltage based on the second power storage portion is applied to the third conductive path, and controls the first and second conversion units based on a detection result by the current detection unit so that current flowing from the first conductive path toward the diode becomes close to zero or below zero.

According to the on-board backup control apparatus in the fifth aspect, it can be directly detected whether or not current flows from the first conductive path to the third conductive path. The voltage applied to the first conductive path and the voltage applied to the second conductive path can be controlled to the desired relationship because, during the prioritizing control, the control unit controls the first conversion unit so that a voltage based on the first power storage portion is applied to the first conductive path and controls the second conversion unit so that a voltage based on the second power storage portion is applied to the third conductive path. By controlling the first and second conversion units so that current flowing from the first conductive path toward the diode becomes close to zero or below zero, an increase in current flowing from the first conductive path toward the diode can be suppressed even if such increase occurs, and a state in which current flow from the first conductive path to the third conductive path is interrupted can be maintained.

In a sixth aspect, the on-board backup control apparatus according to the third aspect, including the following feature(s). The control unit includes a first control unit and a second control unit that respectively control the first supply circuit and the second supply circuit. The first and second control units are configured to be capable of mutually communicating. During the prioritizing control, the first control unit controls the first conversion unit so that a voltage based on the first power storage portion is applied to the first conductive path, the second control unit controls the second conversion unit so that a voltage based on the second power storage portion is applied to the third conductive path, and the first and second control units control the first and second conversion units so that a voltage of the third conductive path is maintained at a voltage at which current flow from the first conductive path to the third conductive path is interrupted.

According to the on-board backup control apparatus in the sixth aspect, a state in which current flow from the first conductive path to the third conductive path is interrupted can be maintained by the first and second control units mutually communicating.

In a seventh aspect, the on-board backup control apparatus according to any one of the first through the sixth aspects, including the following feature(s). The prioritizing control includes restricting control for stopping the supply of power based on the second power storage portion to the second load once the second power storage portion enters a predetermined state. The control unit executes the restricting control in accordance with the predetermined state until a cumulative operation time of the first load based on the first backup operation reaches a predefined time.

According to the on-board backup control apparatus in the seventh aspect, power consumption by the second load after the second power storage portion enters a predetermined state can be suppressed because the supply of power based on the second power storage portion to the second load is stopped (restricting control is executed) once the second power storage portion enters the predetermined state. Thus, power of the second power storage portion for the operation of the first load can be secured by executing the restricting control in accordance with the predetermined state until a cumulative operation time of the first load based on the first backup operation reaches a predefined time.

In an eighth aspect the on-board backup control apparatus according to seventh aspect, including the following feature(s). The predetermined state is a state in which an open-circuit voltage of the second power storage portion has equaled or fallen below a cut-off voltage set according to a predetermined determination method.

According to the on-board backup control apparatus in the eighth aspect, it can be determined whether or not the second power storage portion is in the predetermined state in accordance with the magnitude of an open-circuit voltage of the second power storage portion, and thus the power storage state of the second power storage portion can be detected with higher accuracy.

In a ninth aspect, the on-board backup control apparatus according to any one of the first through the eighth aspects, including the following feature(s). The common load is the second load.

According to the on-board backup control apparatus in the ninth aspect, the priority of the backup operation with respect to the common load can be lowered among the backup operations in which power based on the second power storage portion is supplied. In addition, backup power can be supplied to the common load by a backup operation in which power based on the first power storage portion is supplied. Accordingly, while backup power based on the first power storage portion can be supplied to the common load, the priority thereof in the supply of backup power based on the first power storage portion can be lowered.

First Embodiment

Configuration of On-Board Power Supply System

An on-board power supply system 100 illustrated in FIG. 1 includes a power supply unit 90, loads 91, 92, 93, 94, and 95, and an on-board backup control apparatus 1. The on-board backup control apparatus 1 is also referred to as a backup control apparatus 1.

The power supply unit 90 functions as a main power supply that continuously supplies power in the event that a vehicle in which the on-board power supply system 100 is installed has been started up. The power supply unit 90 is a DC power supply that generates a DC voltage. For example, the power supply unit 90 is formed from a battery such as a lead battery. The high-potential-side terminal and the low-potential-side terminal of the power supply unit 90 are electrically connected to a power line 80 and the ground, respectively. The power supply unit 90 applies a predetermined voltage to the power line 80. Note that, in the present description, voltages refer to those referenced to the ground unless otherwise specified.

The power supply unit 90 is electrically connected to the loads 91, 92, 93, 94, and 95 via the power line 80. Power from the power supply unit 90 is supplied to the loads 91, 92, 93, 94, and 95 via the power line 80. In the example in FIG. 1, the power line 80 includes a power line 81A that is a conductive path that is directly connected to the power supply unit 90, a power line 81B that is connected to the load 91, a power line 81C that is a conductive path that is connected to the load 92, a power line 81D that is a conductive path that is connected to the load 93, a power line 81E that is a conductive path that is connected to the load 94, and a power line 81F that is a conductive path that is connected to the load 95. The power lines 81A, 81B, 81C, 81D, 81E, and 81F are electrically connected to one another. In a state in which power is supplied from the power supply unit 90 to the loads 91, 92, 93, 94, and 95, the power lines 81A, 81B, 81C, 81D, 81E, and 81F have the same potential. An unillustrated relay, fuse, etc., are provided on the power line 80, and these elements have the function of interrupting the electrical continuity of the power line 80.

The loads 91, 92, 93, 94, and 95 are on-board electric devices. The loads 91, 92, 93, 94, and 95 are loads to which power is to be supplied during a predetermined external state (failed state) in which power supply from the power supply unit 90 has stopped. For example, the loads 91, 92, 93, 94, and 95 may each be an actuator such as a motor. Alternatively, the loads 91, 92, 93, 94, and 95 may each be an ECU or an actuator in an electric parking brake system, an ECU or an actuator in a shift-by-wire control system, etc. Alternatively, the loads 91, 92, 93, 94, and 95 may each be an on-board electric device other than those described above.

The load 93 is an example of the "predetermined common load" in the present disclosure. Power can be supplied to the load 93 from a first power storage portion 71 via a later-described first supply circuit 31 and from a second power storage portion 72 via a later-described second supply circuit 32.

The backup control apparatus 1 includes a supply circuit 30, a first control unit 41, a second control unit 42, a first detection unit 51, a second detection unit 52, the first power storage portion 71, and the second power storage portion 72. The supply circuit 30 includes the first supply circuit 31 and the second supply circuit 32. The first supply circuit 31 and the second supply circuit 32 may be disposed on the same board or may be disposed on separate boards. The first control unit 41 and the second control unit 42 are an example of the "control unit" in the present disclosure. The first power storage portion 71 and the second power storage portion 72 are examples of "power storage portions" in the present disclosure. The backup control apparatus 1 is an apparatus that is capable of performing a backup operation of supplying power to the loads 91, 92, 93, 94, and 95 based on power from the first power storage portion 71 and the second power storage portion 72 during a predetermined external state in which the supply of power from the power supply unit 90 to the loads 91, 92, 93, 94, and 95 has been interrupted or has decreased.

The backup control apparatus 1 includes a first power storage unit (base-side unit) 101 and a second power storage unit (expansion-side unit) 102. The first power storage unit 101 includes the first power storage portion 71, and the later-described first control unit 41, first supply circuit 31, and first detection unit 51. The second power storage unit 102 includes the second power storage portion 72, and the later-described second control unit 42, second supply circuit 32, and second detection unit 52.

The first power storage portion 71 and the second power storage portion 72 each function as an auxiliary power supply. Each of the first power storage portion 71 and the second power storage portion 72 is a DC power supply that outputs a DC voltage, and is an electric double-layer capacitor, for example. The first power storage portion 71 is electrically connected to the later-described first supply circuit 31 via a conductive path 15, and is charged and discharged via the first supply circuit 31. The charge voltage (output voltage) of the first power storage portion 71 is applied to the conductive path 15. The high-potential-side terminal of the first power storage portion 71 is electrically connected to the conductive path 15, and has the same potential as the conductive path 15. The low-potential-side terminal of the first power storage portion 71 is electrically connected to the ground, and has the same potential as the ground.

The second power storage portion 72 is electrically connected to the later-described second supply circuit 32 via a conductive path 25, and is charged and discharged via the second supply circuit 32. The charge voltage (output voltage) of the second power storage portion 72 is applied to the conductive path 25. The high-potential-side terminal of the second power storage portion 72 is electrically connected to the conductive path 25, and has the same potential as the conductive path 25. The low-potential-side terminal of the second power storage portion 72 is electrically connected to the ground, and has the same potential as the ground.

In the backup control apparatus 1, the charge voltages (output voltages) of the first power storage portion 71 and the second power storage portion 72 are kept equal to or below a standby voltage in a stationary state in which the startup switch of the vehicle in which the on-board power supply system 100 is installed is in an off state. Furthermore, in response to the startup switch of the vehicle switching to the on state, the backup control apparatus 1 performs charging so that the charge voltages of the first power storage portion 71 and the second power storage portion 72 exceed or equal a target voltage that is higher than the standby voltage. While the startup switch of the vehicle is in the on state, the charge voltages of the first power storage portion 71 and the second power storage portion 72 are maintained at the target voltage unless the failed state occurs. If the startup switch of the vehicle switches from the on state to the off state, the backup control apparatus 1 discharges the first power storage portion 71 and the second power storage portion 72 until the charge voltages of the first power storage portion 71 and the second power storage portion 72 equal or fall below the standby voltage.

The first supply circuit 31 functions so as to supply power from the first power storage portion 71 to the loads 91 and 92, and to the second supply circuit 32. The second supply circuit 32 functions so as to supply power to the loads 94 and 95.

The first supply circuit 31 supplies power based on the first power storage portion 71 to the second supply circuit 32. The first supply circuit 31 operates based on control by the later-described first control unit 41. The first supply circuit 31 is disposed between a conductive path 14 and conductive paths 11, 12, and 13. The first supply circuit 31 includes a voltage conversion circuit such as a DC-DC converter, for example. The voltage conversion circuit executes a charge operation and a discharge operation with respect to the first power storage portion 71. As the charge operation, the voltage conversion circuit executes a voltage conversion operation of boosting or stepping-down the voltage applied to the conductive path 14 and applying the converted voltage to the conductive path 15. As the discharge operation, the voltage conversion circuit executes a voltage conversion operation of boosting or stepping-down the voltage applied to the conductive path 15 and applying the converted voltage to the conductive path 11, etc.

The second supply circuit 32 performs switching between a state in which power based on input from the first supply circuit 31 is supplied to the load 93 and a state in which power based on the second power storage portion 72 is supplied to the load 93. The second supply circuit 32 operates based on control by the later-described second control unit 42. The second supply circuit 32 is disposed between a conductive path 24 and conductive paths 21, 22, and 23. The second supply circuit 32 includes a voltage conversion circuit such as a DC-DC converter, for example. The voltage conversion circuit executes a charge operation and a discharge operation with respect to the second power storage portion 72. As the charge operation, the voltage conversion circuit executes a voltage conversion operation of boosting or stepping-down the voltage applied to the conductive path 24 and applying the converted voltage to the conductive path 25. Upon supplying power based on the second power storage portion 72 to the load 93, the voltage conversion circuit executes, as the discharge operation, a voltage conversion operation of boosting or stepping-down the voltage applied to the conductive path 25 and applying the converted voltage to the conductive path 21, etc.

The first control unit 41 controls the operation of supplying power from the first power storage portion 71 to the load 91, the load 92, and the second supply circuit 32. The first control unit 41 is an information processing apparatus that has an information processing function, a computing function, a control function, etc. The first control unit 41 is formed using a microcomputer as the main component, for example, and includes a computing device such as a Central Processing Unit (CPU), a memory such as a Read-Only Memory (ROM) or a Random-Access Memory (RAM), an AD converter, etc. The first control unit 41 has a function of controlling the first supply circuit 31.

The second control unit 42 controls the operation of supplying power from the second power storage portion 72 to the loads 93, 94, and 95. The second control unit 42 is an information processing apparatus that has an information processing function, a computing function, a control function, etc. The second control unit 42 is formed using a microcomputer as the main component, for example, and includes a computing device such as a Central Processing Unit (CPU), a memory such as a Read-Only Memory (ROM) or a Random-Access Memory (RAM), an AD converter, etc. The second control unit 42 has a function of controlling the second supply circuit 32.

For example, the first detection unit 51 is configured as a voltage detection circuit. The first detection unit 51 detects the voltage of the conductive path 14. The conductive path 14 is a conductive path that is electrically connected to the power line 80 and has the same potential as the power line 80. Accordingly, the first detection unit 51 is capable of detecting the voltage of the power line 80.

The conductive path 11 is a conductive path between the first supply circuit 31 and the load 91. The conductive path 12 is a conductive path between the first supply circuit 31 and the load 92. The conductive path 13 is a conductive path between the first supply circuit 31 and the second supply circuit 32.

For example, the second detection unit 52 is configured as a voltage detection circuit. The second detection unit 52 detects the voltage of the conductive path 24. The conductive path 24 is a conductive path that is electrically connected to the power line 80 and has the same potential as the power line 80. Accordingly, the second detection unit 52 is capable of detecting the voltage of the power line 80.

The conductive path 21 is a conductive path between the second supply circuit 32 and the load 93. The conductive path 22 is a conductive path between the second supply circuit 32 and the load 94. The conductive path 23 is a conductive path between the second supply circuit 32 and the load 95.

Detailed Configuration of Backup Control Apparatus

Figure 2:
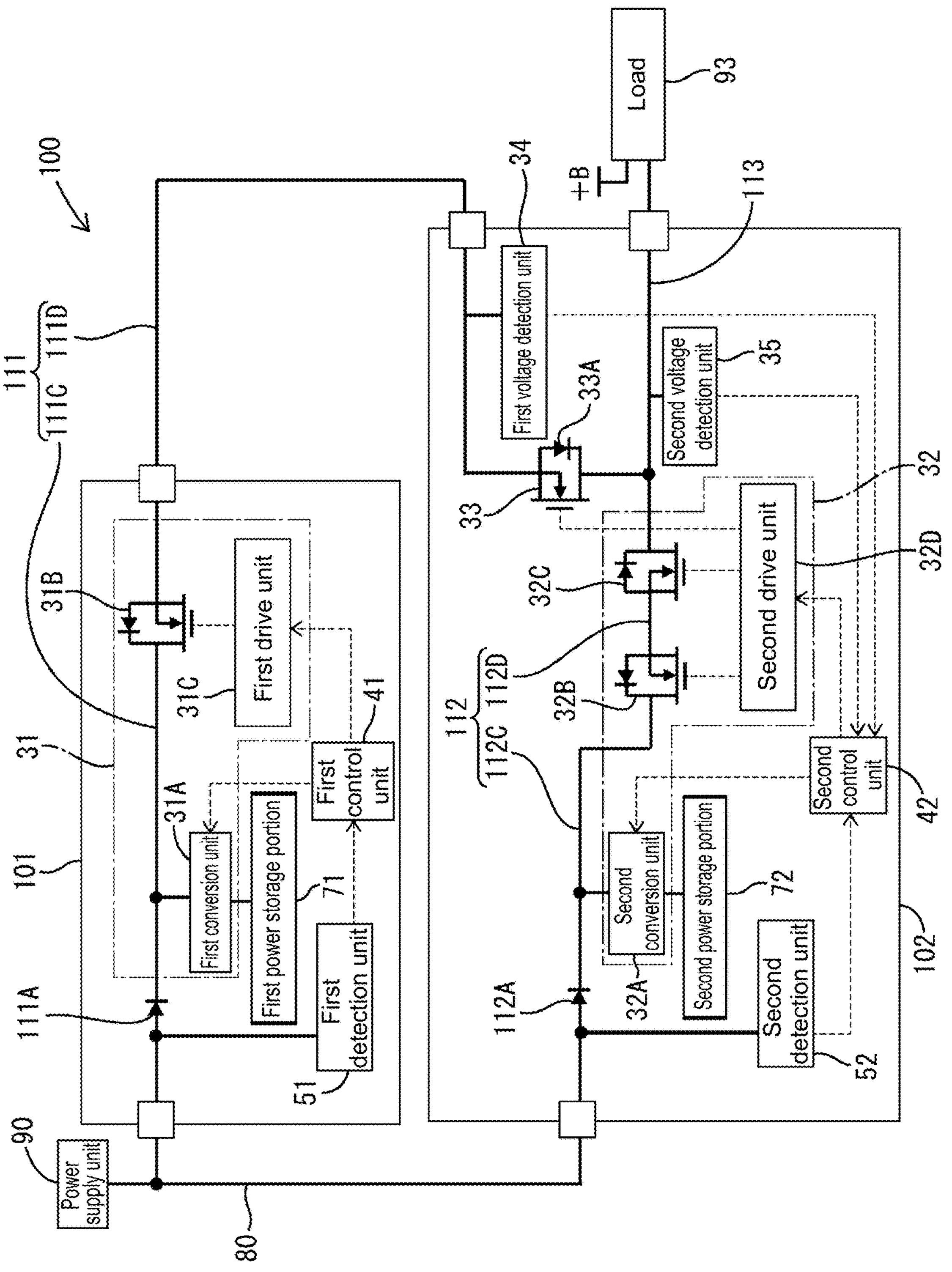
FIG. 2 is a block diagram illustrating in detail a part of the block diagram in FIG. 1.

FIG. 2 illustrates an example of a detailed configuration of the backup control apparatus 1. The first supply circuit 31 can output power based on the first power storage portion 71 to the load 93 via a first conductive path 111. The first conductive path 111 is a conductive path between a diode 111A and a switching element 33. The anode of the diode 111A is electrically connected to the power line 80. The cathode of the diode 111A is electrically connected to one end of the first conductive path 111. The other end of the first conductive path 111 is electrically connected to the source of the switching element 33.

The first supply circuit 31 includes a first conversion unit 31A, a switching element 31B, and a first drive unit 31C. For example, the first conversion unit 31A is configured as a DC-DC converter. The first conversion unit 31A is electrically connected to the first conductive path 111. Based on control by the first control unit 41, the first conversion unit 31A performs a charge operation and a discharge operation with respect to the first power storage portion 71. As the charge operation, the first conversion unit 31A executes a voltage conversion operation of boosting or stepping-down an input voltage from the first conductive path 111 and applying the converted voltage to the first power storage unit 71. As the discharge operation, the first conversion unit 31A boosts or steps-down an input voltage based on power from the first power storage portion 71 and applying an output voltage to the first conductive path 111. For example, the switching element 31B is configured as an N-channel MOSFET. The drain of the switching element 31B is electrically connected to a conductive portion 111C. The conductive portion 111C is a conductive path that forms the power-supply-unit-90-side portion of the first conductive path 111. The source of the switching element 31B is electrically connected to a conductive portion 111D. The conductive portion 111D is a conductive path that forms the third-conductive-path-113-side portion of the first conductive path 111. The first drive unit 31C is a drive circuit that drives the switching element 31B. The first drive unit 31C outputs a control signal to the gate of the switching element 31B.

The second supply circuit 32 can output power based on the second power storage portion 72 to the load 93 via a second conductive path 112. The second conductive path 112 is a conductive path between a diode 112A and the switching element 33. The anode of the diode 112A is electrically connected to the power line 80. The cathode of the diode 112A is electrically connected to the second conductive path 112.

The second supply circuit 32 supplies power based on the second power storage portion 72 to one or more loads (for example, the loads 94 and 95) and one or more loads (for example, the load 93). The loads 94 and 95 correspond to a "first load" in the present disclosure. The load 93 corresponds to a "second load" in the present disclosure.

The second supply circuit 32 includes a second conversion unit 32A, a switching element 32B, a switching element 32C, and a second drive unit 32D. For example, the second conversion unit 32A is configured as a DC-DC converter. The second conversion unit 32A is electrically connected to the second conductive path 112. Based on control by the second control unit 42, the second conversion unit 32A performs a charge operation and a discharge operation with respect to the second power storage portion 72. As the charge operation, the second conversion unit 32A executes a voltage conversion operation of boosting or stepping-down an output voltage of the second power storage portion 72 and applying the converted voltage to the second conductive path 112. As the discharge operation, the second conversion unit 32A boosts or steps-down an input voltage based on power from the second power storage portion 72 and applies an output voltage to the second conductive path 112. For example, the switching element 32B is configured as an N-channel MOSFET. The drain of the switching element 32B is electrically connected to a conductive portion 112C. The conductive portion 112C is a conductive path that forms the power-supply-unit-90-side portion of the second conductive path 112. The source of the switching element 32B is electrically connected to a conductive portion 112D. The conductive portion 112D is a conductive path that forms the third-conductive-path-113-side portion of the second conductive path 112. For example, the switching element 32C is configured as an N-channel MOSFET. The source of the switching element 32C is electrically connected to the conductive portion 112D. The drain of the switching element 32C is electrically connected to a later-described third conductive path 113. The second drive unit 32D is a drive circuit that drives the switching element 32B. The second drive unit 32D outputs a control signal to the gate of the switching element 32B.

The backup control apparatus 1 (specifically, the second power storage unit 102) further includes the switching element 33, a first voltage detection unit 34, and a second voltage detection unit 35. For example, the switching element 33 is configured as an N-channel MOSFET. The source of the switching element 33 is electrically connected to the first conductive path 111. The drain of the switching element 33 is electrically connected to the third conductive path 113. A diode 33A is the body diode (parasitic diode) of the switching element 33. The diode 33A is provided between the first conductive path 111 and the third conductive path 113. The anode of the diode 33A is electrically connected to the first-conductive-path 111 side. The cathode of the diode 33A is electrically connected to the third-conductive-path 113 side. The diode 33A (specifically, the switching element 33) may be mounted on a board to which the first supply circuit 31 is provided, may be mounted on a board to which the second supply circuit 32 is provided, or may be provided so as to be on the outside of the board to which the first supply circuit 31 is provided and the board to which the second supply circuit 32 is provided.

The third conductive path 113 is a path for outputting power to the load 93. The third conductive path 113 is a path to which power is supplied from the first conductive path 111 and the second conductive path 112. The third conductive path 113 is electrically connected to the load 93.

For example, the first voltage detection unit 34 is configured as a voltage detection circuit. The first voltage detection unit 34 detects the voltage of the first conductive path 111 (specifically, the conductive portion 111D). The first voltage detection unit 34 is capable of detecting a value based on the output voltage from the first conversion unit 31A.

For example, the second voltage detection unit 35 is configured as a voltage detection circuit. The second voltage detection unit 35 detects the voltage of the third conductive path 113. The second voltage detection unit 35 is capable of detecting a value based on the output voltage from the first conversion unit 31A or a value based on the output voltage from the second conversion unit 32A.

Operation of Backup Control Apparatus

Figure 3:
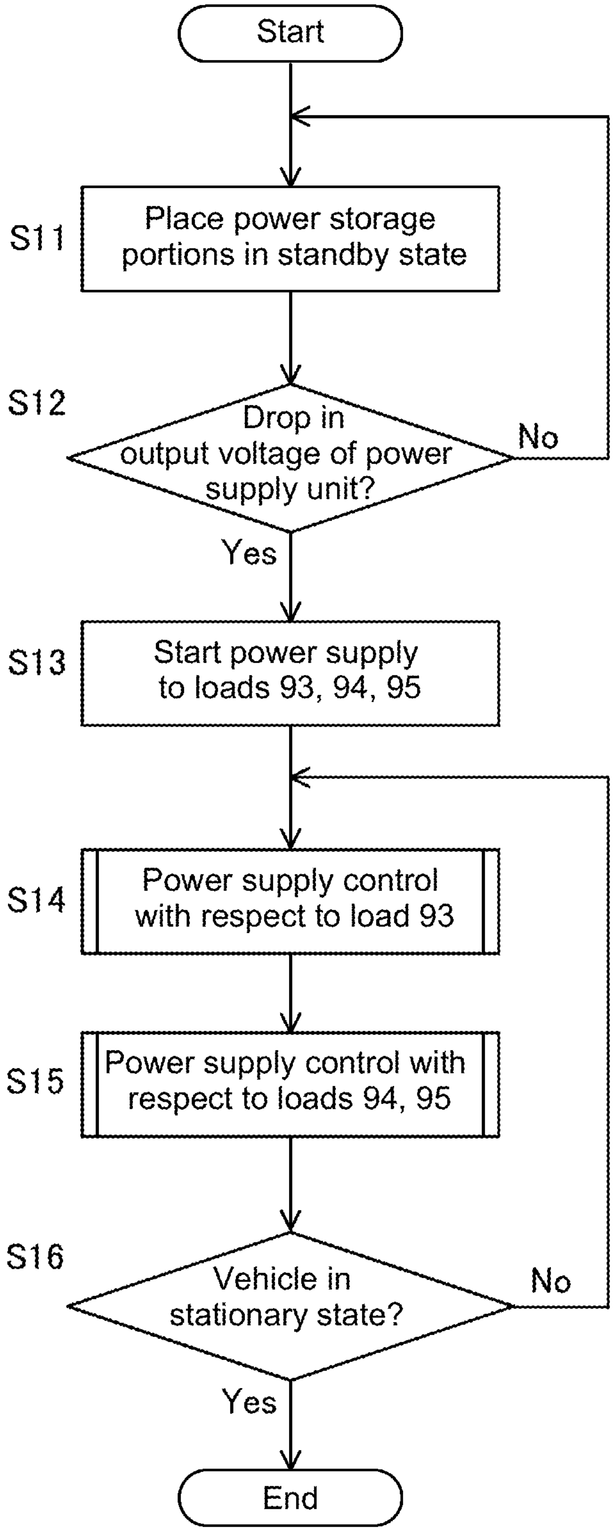
FIG. 3 is a flowchart illustrating an example flow of control executed by the on-board backup control apparatus in the first embodiment.

FIG. 3 illustrates an example of backup control executed by the backup control apparatus 1 (specifically, the first control unit 41 and the second control unit 42). The first control unit 41 and the second control unit 42 start the backup control in FIG. 3 if a predetermined starting condition is met. For example, the condition for starting the backup control in FIG. 3 may be that the startup switch of the vehicle in which the on-board power supply system 100 is installed has switched from the off state to the on state, or a different condition. In the representative example described in the following, a startup signal indicating that the startup switch has switched to the on state is provided to the first control unit 41 and the second control unit 42 from an external device (for example, an external Electronic Control Unit (ECU)) once the startup switch of the vehicle has switched from the off state to the on state. The first control unit 41 and the second control unit 42 start the backup control in FIG. 3 upon receiving such a startup signal.

Upon starting the backup control in FIG. 3, the first control unit 41 and the second control unit 42 perform charging in step S11 so that the charge voltages of the first power storage portion 71 and the second power storage portion 72 exceed or equal the target voltage, which is higher than the standby voltage. The first control unit 41 and the second control unit 42 maintain the charge voltages of the first power storage portion 71 and the second power storage portion 72 at the target voltage.

From the start of the backup control until a later-described predetermined voltage drop state of the output voltage of the power supply unit 90 is detected (until the determination of Yes in step S12), a backup standby state continues. In the backup standby state, control is executed by the first control unit 41 and the second control unit 42 so that the output voltage of the second conversion unit 32A is higher than the output voltage of the first conversion unit 31A. In the backup standby state, the switching element 31B turns on by being controlled by the first control unit 41. The switching element 32B turns on, the switching element 32C turns off, and the switching element 33 turns off by being controlled by the second control unit 42.

In step S12, the first control unit 41 and the second control unit 42 determine whether or not the output voltage of the power supply unit 90 (main power supply) has dropped (whether or not the output voltage is in the predetermined voltage drop state). For example, the first control unit 41 determines whether or not the voltage of the conductive path 14 is lower than a threshold (whether or not the voltage is in the predetermined voltage drop state) based on the voltage detected by the first detection unit 51. This threshold is a value that is significantly lower than the output voltage that the power supply unit 90 applies to the power line 80 in the normal state, and is a value greater than 0. Note that the second control unit 42 may determine whether or not the voltage of the conductive path 24 is lower than the threshold (whether or not the voltage is in the predetermined voltage drop state) based on the voltage detected by the second detection unit 52. Upon determining that the voltage of the conductive path 14 is lower than the threshold in step S12 (Yes in step S12), the first control unit 41 advances processing to step S13. In the present representative example, a case in which the voltage of the conductive path 14 is lower than the threshold, i.e., a case in which the voltage of the power line 80 is lower than the threshold, is an example of the "predetermined external state". Upon determining that the voltage of the conductive path 14 is higher than or equal to the threshold in step S12 (No in step S12), the first control unit 41 executes the processing in step S11 again.

For example, the voltages of the conductive paths 14 and 24 equal approximately 0 V in an abnormal state in which a ground fault or a disconnection has occurred in the power line 80 and power supply from the power supply unit 90 to the conductive paths 14 and 24 and to the power lines 81B, 81C, 81D, 81E, and 81F has ceased. In such a case, according to the backup control apparatus 1, the first control unit 41 and the second control unit 42 perform a backup operation of supplying power to the plurality of loads 91, 92, 93, 94, and 95 based on power from the first power storage portion 71 and the second power storage portion 72. The second control unit 42 executes the processing in and following step S13 with respect to the loads 93, 94, and 95. Note that, in the following, description regarding the backup operation that the first control unit 41 performs with respect to the loads 91 and 92 is omitted, and a case in which power is supplied to the loads 93, 94, and 95 by the second control unit 42 will be described.

Upon determining in step S12 that the voltage of the conductive path 14 is lower than the threshold (Yes in step S12), the second control unit 42 starts supplying power to the loads 93, 94, and 95 in step S13. The second control unit 42 causes the second supply circuit 32 to perform an operation of supplying power to the conductive paths 21, 22, and 23. Once the backup operation (step S13) is started, the switching element 31B is kept in the on state. This allows current to flow from the first conversion unit 31A to the anode of the diode 33A. The switching element 32B is kept in the on state. This allows current to flow from the second conversion unit 32A to the third-conductive-path-113-side. Furthermore, the switching element 32C is kept in the off state, and the switching element 33 is kept in the off state.

Figure 4:
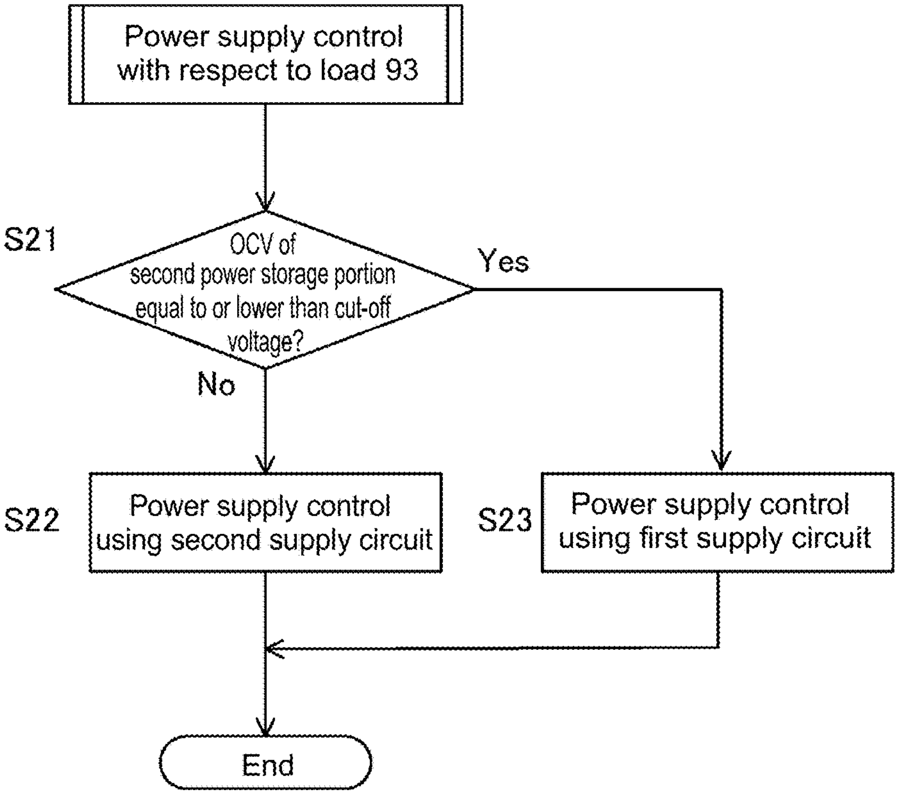
FIG. 4 is a subroutine relating to power-supply control with respect to a second load in the flowchart in FIG. 3.

In subsequent step S14, the second control unit 42 executes power-supply control with respect to the load 93. In the power-supply control with respect to the load 93, the second control unit 42 first determines whether or not the open-circuit voltage (OCV) of the second power storage portion 72 is equal to or lower than the cut-off voltage as illustrated in FIG. 4 (step S21). For example, the open-circuit voltage Vocv of the second power storage portion 72 can be calculated using relational expression (1) below.

$$Vocv = Vccv - I \times R \tag{1}$$

Vccv represents the closed-circuit voltage, and represents the output voltage output from the second power storage portion 72. I represents current flowing in the second power storage portion 72. R represents the internal resistance.

Figure 6:
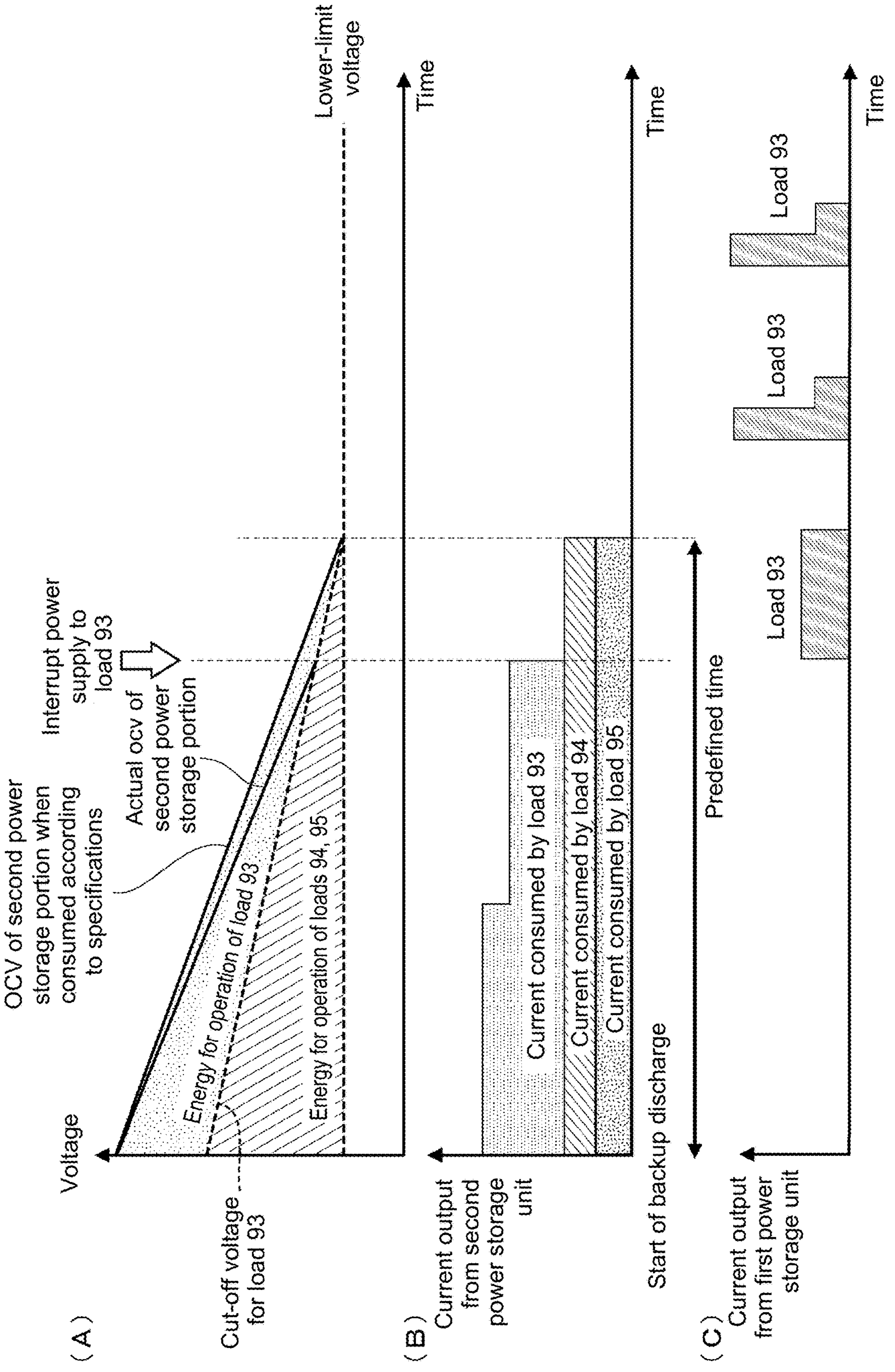
FIG. 6 is an explanatory diagram describing a case in which an actual open-circuit voltage of a second power storage portion falls below a cut-off voltage before the elapse of a predefined time in the on-board backup control apparatus in FIG. 1.

The cut-off voltage is a threshold voltage set according to a predetermined determination method. For example, the cut-off voltage may be determined using a mathematical expression which includes a cumulative operation time t as a variable and sets the cut-off voltage such that the greater the variable t, the lower the cut-off voltage. The cut-off voltage may be determined using a mathematical expression in which the cut-off voltage is set based on power consumption by the loads 94 and 95 from the start of the backup operation. As illustrated in FIG. 6, the cut-off voltage (cutoff voltage for the load 93) may be determined as a voltage corresponding to the energy for operation of the loads 94 and 95 (energy with which the loads 94 and 95 can operate for the remaining time). Alternatively, the cut-off voltage may be determined as a fixed value.

Upon determining in step S21 that the open-circuit voltage of the second power storage portion 72 is not lower than or equal to the cut-off voltage (higher than the cut-off voltage) (No in step S21), the second control unit 42 executes supply control using the second supply circuit 32 (step 22). The second control unit 42 controls and causes the second supply circuit 32 to output power based on the second power storage portion 72 to the load 93 via the second conductive path 112. Here, the first control unit 41 and the second control unit 42 control the first conversion unit 31A and the second conversion unit 32A based on voltage detection results by the first voltage detection unit 34 and the second voltage detection unit 35 so that the voltage of the third conductive path 113 is maintained at a voltage at which current flow from the first conductive path 111 to the third conductive path 113 is interrupted. For example, the cathode voltage of the diode 33A (voltage of the third conductive path 113) is controlled so as to have a greater value than the anode voltage of the diode 33A (voltage of the first conductive path 111). Furthermore, the switching element 31B remains in the on state. The switching element 32B remains on. Furthermore, the switching element 32C turns on by being controlled by the second control unit 42. The switching element 33 remains off.

On the other hand, upon determining in step S21 that the open-circuit voltage of the second power storage portion 72 is no higher than the cut-off voltage (Yes in step S21), the first control unit 41 and the second control unit 42 stop the supply control using the second supply circuit 32 and execute supply control using the first supply circuit 31 (step 23). The second control unit 42 stops the supply of power based on the second power storage portion 72 to the load 93. The first control unit 41 controls and causes the first supply circuit 31 to output power based on the first power storage portion 71 to the load 93 via the first conductive path 111. Specifically, the switching element 31B remains on. The switching element 32B turns off, the switching element 32C turns off, and the switching element 33 turns on by being controlled by the second control unit 42. After the processing in step S22 or S23, the first control unit 41 and the second control unit 42 execute step S15 in FIG. 3.

Figure 5:
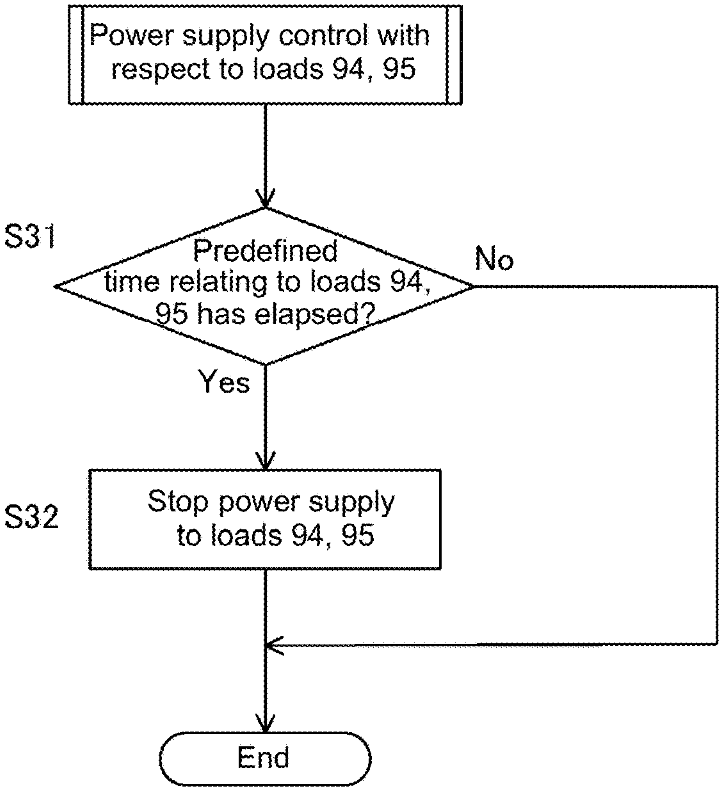
FIG. 5 is a subroutine relating to power-supply control with respect to a firstload in the flowchart in FIG. 3.
Figure 7:
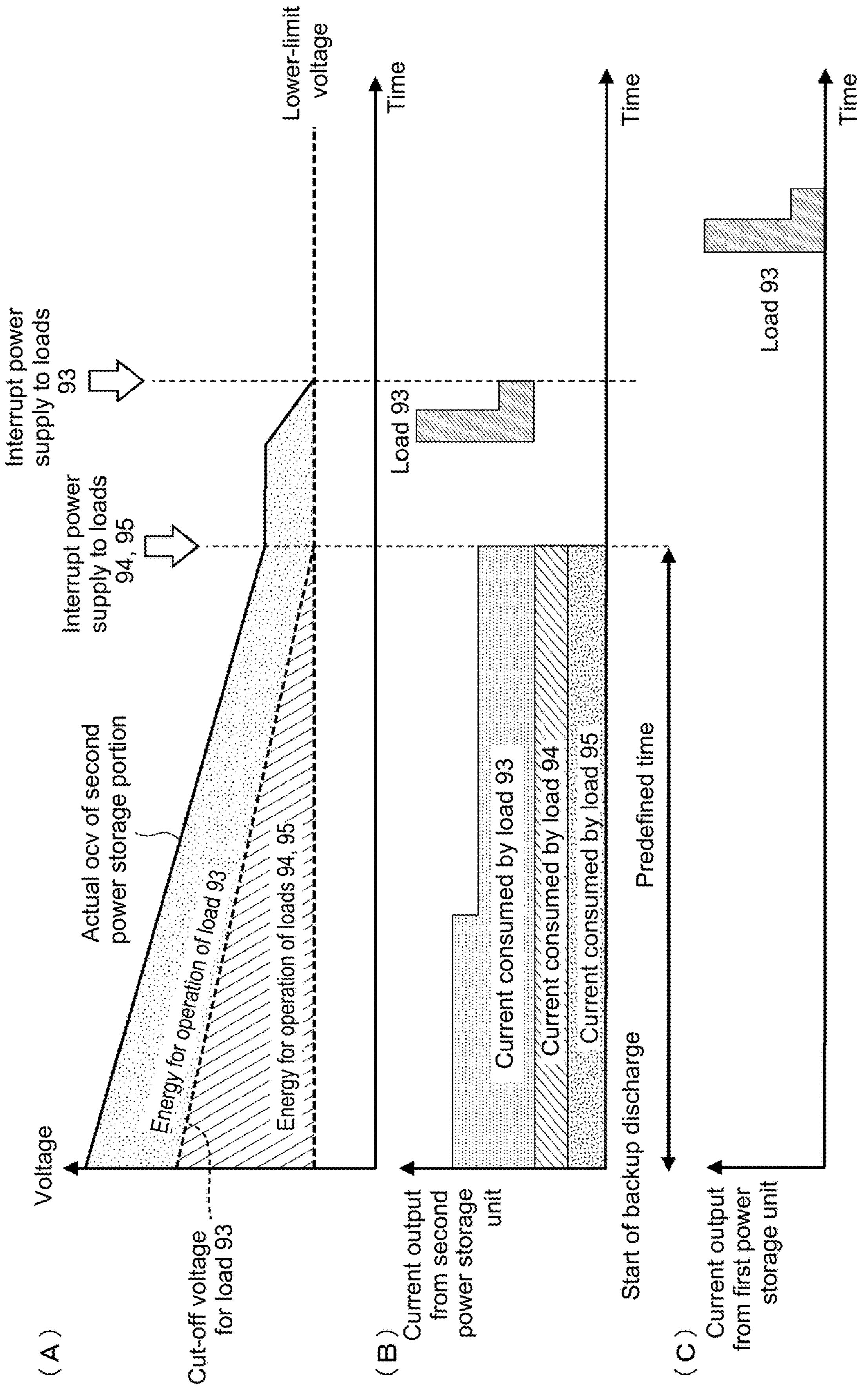
FIG. 7 is an explanatory diagram describing a case in which the predefined time elapses before the actual open-circuit voltage of the second power storage portion falls below the cut-off voltage in the on-board backup control apparatus in FIG. 1.

In subsequent step S15, the first control unit 41 and the second control unit 42 execute power supply control with respect to the loads 94 and 95. In the power-supply control with respect to the loads 94 and 95, the second control unit 42 first determines whether or not a predefined time relating to the loads 94 and 95 has elapsed as illustrated in FIG. 5 (step S31). For example, the predefined time is a time that is set in advance to cause the loads 94 and 95 to operate continuously. For example, the predefined time is set based on power consumed by a single operation of the loads 94 and 95, the number of times the loads 94 and 95 are scheduled to operate, or the like. Note that continuous operation of the loads 94 and 95 during the predefined time includes a state in which the loads 94 and 95 operate continuously without any breaks and also a state in which the loads 94 and 95 operate intermittently. For example, as illustrated in FIG. 7, the predefined time is the time from the starting point of the backup operation to when the energy for operation of the loads 94 and 95 (energy with which the loads 94 and 95 can operate for the remaining time) falls below a predetermined lower-limit voltage.

Upon determining in step S31 that the predefined time relating to the loads 94 and 95 has elapsed, the first control unit 41 and the second control unit 42 stop power supply to the loads 94 and 95 in subsequent step S32. Subsequently, the first control unit 41 and the second control unit 42 execute step S16 illustrated in FIG. 3. On the other hand, upon determining in step S31 that the predefined time relating to the loads 94 and 95 has not elapsed, the first control unit 41 and the second control unit 42 execute step S16 illustrated in FIG. 3.

By executing the processing in above-described steps S14 and S15, the first control unit 41 and the second control unit 42 execute predetermined prioritizing control for prioritizing a first backup operation over a second backup operation during the external state. The first backup operation is the operation of supplying power based on the second power storage portion 72 to the loads 94 and 95. The second backup operation is the operation of supplying power based on the second power storage portion 72 to the load 93. The prioritizing control includes restricting control (step S23) for stopping the supply of power based on the second power storage portion 72 to the load 93 once the second power storage portion 72 enters a predetermined state. The first control unit 41 and the second control unit 42 execute the restricting control (step S23) in accordance with the predetermined state until the cumulative operation time of the loads 94 and 95 based on the first backup operation reaches the predefined time (until Yes in step S31).

During the prioritizing control, the first control unit 41 and the second control unit 42 control the output to the first conductive path 111 by the first conversion unit 31A and the output to the second conductive path 112 by the second conversion unit 32A so that power based on the second power storage portion 72 is supplied to the third conductive path 113 via the second conductive path 112 and power based on the first power storage portion 71 is interrupted by the diode 33A. Specifically, during the prioritizing control, the first control unit 41 and the second control unit 42 control the first conversion unit 31A so that a voltage based on the first power storage portion 71 is applied to the first conductive path 111, and control the second conversion unit 32A so that a voltage based on the second power storage portion 72 is applied to the third conductive path 113. Furthermore, the first control unit 41 and the second control unit 42 control the first conversion unit 31A and the second conversion unit 32A based on the voltage detection results by the first voltage detection unit 34 and the second voltage detection unit 35 so that the voltage of the third conductive path 113 is maintained at a voltage at which current flow from the first conductive path 111 to the third conductive path 113 is interrupted. For example, the cathode voltage of the diode 33A (voltage of the third conductive path 113) is controlled so as to have a greater value than the anode voltage of the diode 33A (voltage of the first conductive path 111). Thus, power is supplied to the load 93 selectively from only the second power storage portion 72. Upon switching from the state in which power based on the second power storage portion 72 is supplied to the third conductive path 113 to the state in which power based on the first power storage portion 71 is supplied to the third conductive path 113, power based on the first power storage portion 71 can be supplied immediately to the third conductive path 113 via the diode 33A. Thus, an interruption of power supply to the load 93 can be prevented from occurring during a switch between power sources.

After executing the power-supply control with respect to the loads 94 and 95 (step S15), the first control unit 41 and the second control unit 42 determine in subsequent step S16 whether or not the vehicle in which the on-board power supply system 100 is installed is in a stationary state. The first control unit 41 and the second control unit 42 determine whether or not the startup switch of the vehicle in which the on-board power supply system 100 is installed has switched from the on state to the off state. For example, a startup signal indicating that the startup switch has switched to the off state is provided to the first control unit 41 and the second control unit 42 from an external device (for example, an external Electronic Control Unit (ECU)) once the startup switch of the vehicle has switched from the on state to the off state. The first control unit 41 and the second control unit 42 determine that the vehicle is in the stationary state upon receiving such a startup signal. Upon determining in step S16 that the vehicle is not in the stationary state (is in the started state) (No in step S16), the first control unit 41 and the second control unit 42 execute the processing in step S14 again. Upon determining in step S16 that the vehicle is in the stationary state (Yes in step S16), the first control unit 41 and the second control unit 42 terminate the backup control in FIG. 2.

The following explanation relates to an example effect of the present configuration.

The backup control apparatus 1 can perform a backup operation using the first power storage portion 71 and the second power storage portion 72 during an external state in which the supply of power from the power supply unit 90 has been interrupted or has decreased. According to this backup control apparatus 1, power can be supplied to a predetermined common load (load 93) from the first power storage portion 71 and the second power storage portion 72. Thus, during the backup operation, the backup control apparatus 1 can combine an operation in which power is supplied to the common load from the first power storage portion 71 and an operation in which power is supplied to the common load from the second power storage portion 72. In addition to this, by predetermined prioritizing control being executed by the first control unit 41 and the second control unit 42, a first backup operation (operation in which power based on the second power storage portion 72 is supplied to the loads 94 and 95) can be prioritized over a second backup operation (operation in which power based on the second power storage portion 72 is supplied to the load 93).

Furthermore, according to the backup control apparatus 1, power consumption by the loads 94 and 95 after the second power storage portion 72 enters a predetermined state can be suppressed because the supply of power based on the second power storage portion 72 to a load 93 is stopped (restricting control is executed) once the second power storage portion 72 enters the predetermined state. Thus, power of the second power storage portion 72 for the operation of the loads 94 and 95 can be secured by executing the restricting control in accordance with the predetermined state until a cumulative operation time of the load 93 based on the first backup operation reaches a predefined time.

Furthermore, according to the backup control apparatus 1, it can be determined whether or not the second power storage portion 72 is in the predetermined state in accordance with the magnitude of an open-circuit voltage of the second power storage portion 72, and thus the power storage state of the second power storage portion 72 can be detected with higher accuracy.

According to the backup control apparatus 1, power based on the second power storage portion 72 can be supplied to the third conductive path 113 via the second conductive path 112 during the prioritizing control by the first control unit 41 and the second control unit 42. Because power based on the first power storage portion 71 is interrupted by the diode 33A in a state in which an output voltage is applied to the first conductive path 111 by the first conversion unit 31A, a state for preparing for the supply of backup power to the common load (load 93) can be established while suppressing consumption of power based on the first power storage portion 71. Upon switching from the state in which power based on the second power storage portion 72 is supplied to the third conductive path 113 to the state in which power based on the first power storage portion 71 is supplied to the third conductive path 113, power based on the first power storage portion 71 can be supplied immediately to the third conductive path 113 via the diode 33A. Thus, an interruption of power supply to the common load (load 93) can be prevented from occurring during a switch between power sources.

According to the backup control apparatus 1, the first conversion unit 31A and the second conversion unit 32A can be controlled based on voltage detection results by the first voltage detection unit 34 and the second voltage detection unit 35 during the prioritizing control by the first control unit 41 and the second control unit 42. Thus, a voltage applied to the first conductive path 111 based on power from the first power storage portion 71 and a voltage applied to the second conductive path 112 based on power from the second power storage portion 72 can be controlled directly.

According to the backup control apparatus 1, the priority of the backup operation with respect to the common load (load 93) can be lowered among the backup operations in which power based on the second power storage portion 72 is supplied. In addition, backup power can be supplied to the common load (load 93) by a backup operation in which power based on the first power storage portion 71 is supplied. Accordingly, while backup power based on the first power storage portion 71 can be supplied to the common load (load 93), the priority thereof in the supply of backup power based on the first power storage portion 71 can be lowered.

Second Embodiment

An on-board power supply system 200 in a second embodiment differs from the on-board power supply system 100 in the first embodiment in that a current detection unit 234 is provided in place of the first voltage detection unit 34 and the second voltage detection unit 35, and is the same as the on-board power supply system 100 in the first embodiment in other regards. Note that the same reference symbol is provided to configurations that are the same as those in the first embodiment, and detailed description thereof is omitted.

Figure 8:
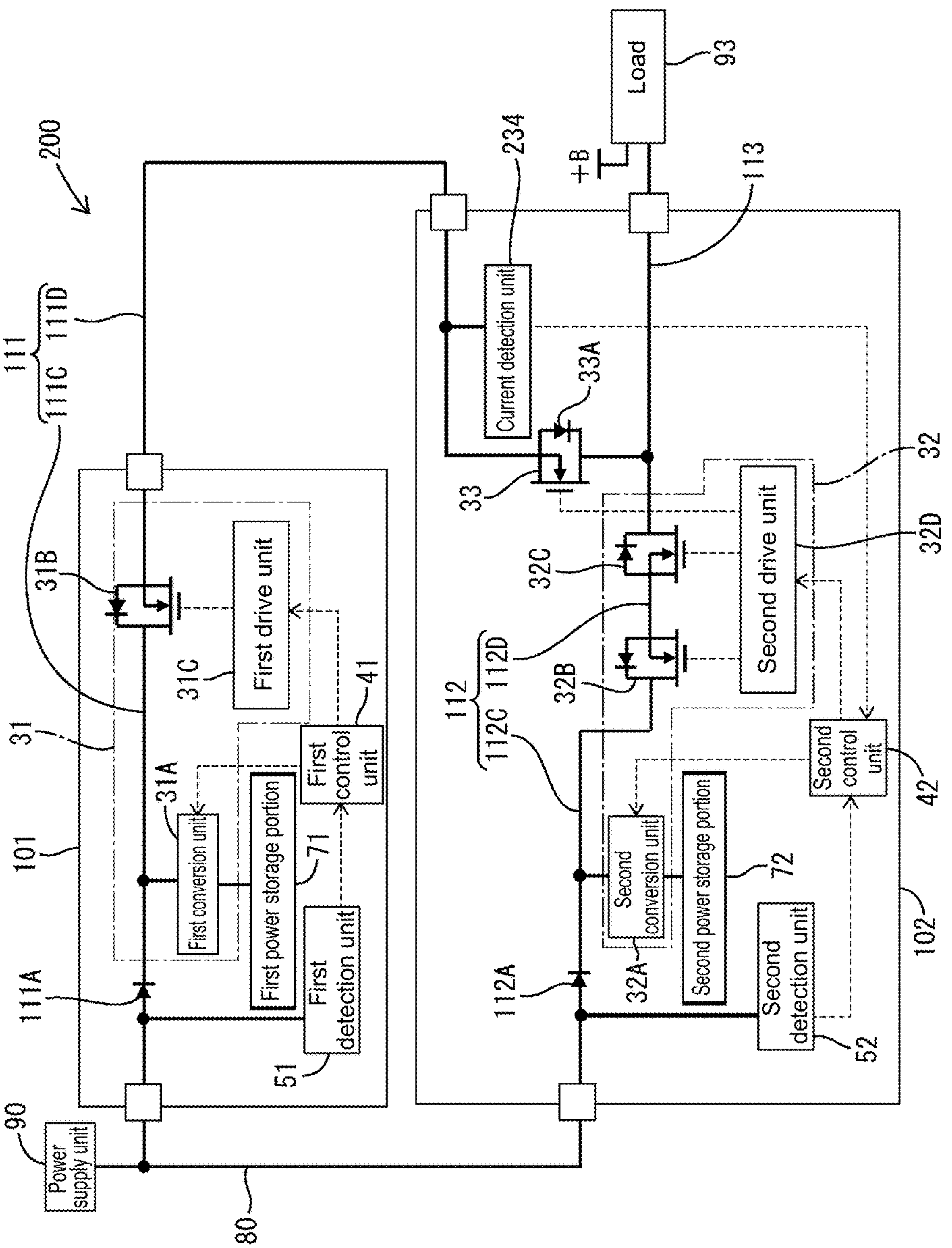
FIG. 8 is a block diagram schematically illustrating an example of an on-board power supply system including the on-board backup control apparatus in a second embodiment.

In the on-board power supply system 200, the second power storage unit 102 includes the current detection unit 234 as illustrated in FIG. 8. The current detection unit 234 is configured as a current detection circuit. The current detection unit 234 detects current flowing in the first conductive path 111 (specifically, the conductive portion 111D).

The backup control by the backup control apparatus 1 is similar to that in the first embodiment, and the specific details of control described in the following differ from those in the first embodiment. During the prioritizing control, the first control unit 41 and the second control unit 42 control the first conversion unit 31A so that a voltage based on the first power storage portion 71 is applied to the first conductive path 111, and control the second conversion unit 32A so that a voltage based on the second power storage portion 72 is applied to the third conductive path 113. During the prioritizing control, the control units further control the first conversion unit 31A and the second conversion unit 32A based on a detection result by the current detection unit 234 so that current flowing from the first conductive path 111 toward the diode 33A becomes close to zero or below zero. For example, the cathode voltage of the diode 33A (voltage of the third conductive path 113) is controlled so as to have a greater value than the anode voltage of the diode 33A (voltage of the first conductive path 111). Thus, power is supplied to the load 93 selectively from only the second power storage portion 72.

According to the backup control apparatus 1, it can be directly detected whether or not current flows from the first conductive path 111 to the third conductive path 113. The voltage applied to the first conductive path 111 and the voltage applied to the second conductive path 112 can be controlled to the desired relationship because, during the prioritizing control, the first control unit 41 and the second control unit 42 control the first conversion unit 31A so that a voltage based on the first power storage portion 71 is applied to the first conductive path 111 and control the second conversion unit 32A so that a voltage based on the second power storage portion 72 is applied to the third conductive path 113. By controlling the first conversion unit 31A and the second conversion unit 32A so that current flowing from the first conductive path 111 toward the diode 33A becomes close to zero or below zero, an increase in current flowing from the first conductive path 111 toward the diode 33A can be suppressed even if such increase occurs, and a state in which current flow from the first conductive path 111 to the third conductive path 113 is interrupted can be maintained. An interruption of power supply to the common load (load 93) can be prevented from occurring during a switch between power sources.

Third Embodiment

An on-board power supply system 300 in the third embodiment differs from the on-board power supply system 100 in the first embodiment in that the first control unit 41 and the second control unit 42 are capable of mutually communicating, and is the same as the on-board power supply system 100 in the first embodiment in other regards. Note that the same reference symbol is provided to configurations that are the same as those in the first embodiment, and detailed description thereof is omitted.

Figure 9:
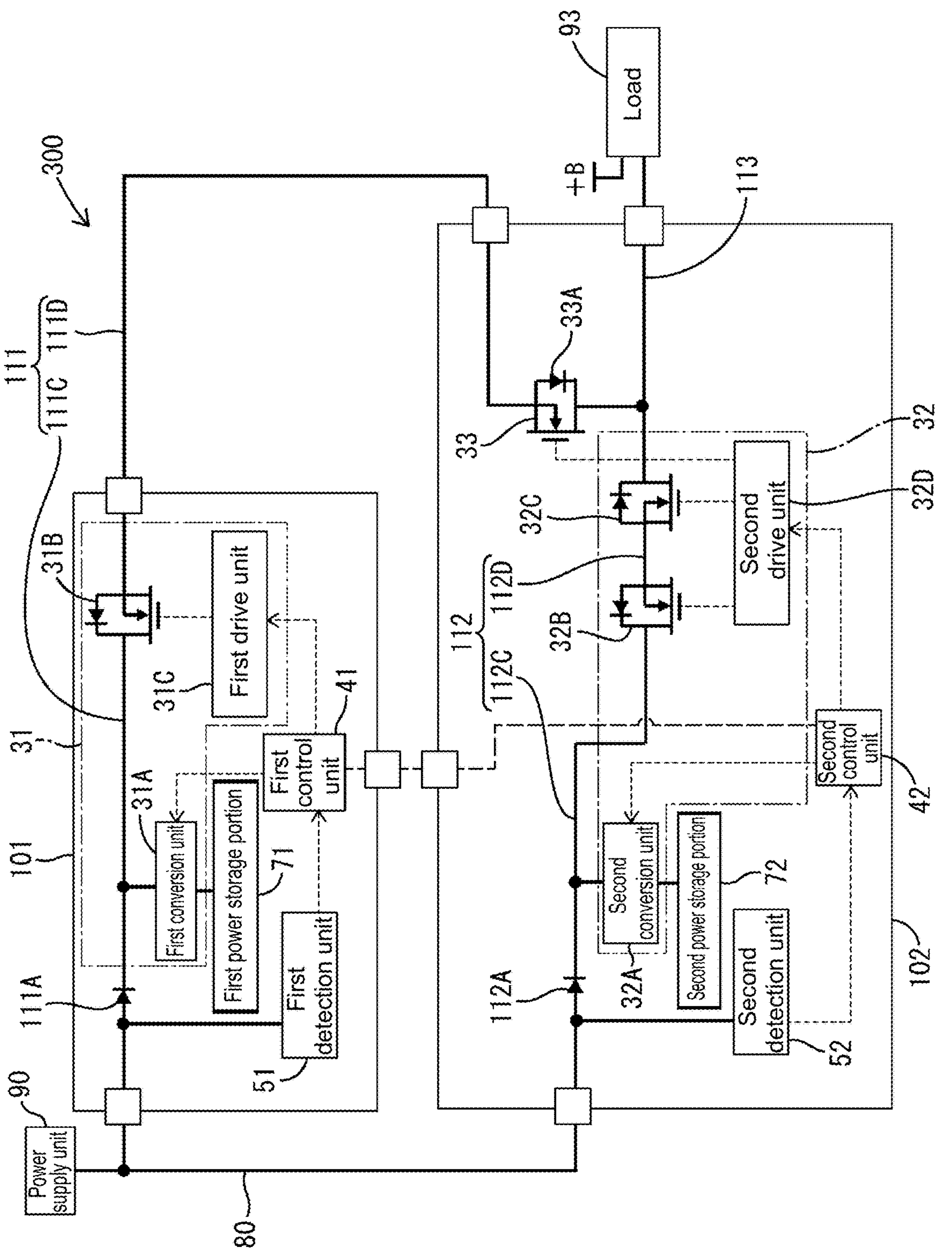
FIG. 9 is a block diagram schematically illustrating an example of an on-board power supply system including the on-board backup control apparatus in a third embodiment.

In the on-board power supply system 300, the backup control apparatus 1 includes the first control unit 41 and the second control unit 42 as illustrated in FIG. 9. The first control unit 41 and the second control unit 42 are capable of mutually communicating. For example, the communication method of the communication between the first control unit 41 and the second control unit 42 is not limited, and may be Control Area Network (CAN) communication, Local Interconnect Network (LIN) communication, or the like.

The backup control by the backup control apparatus 1 is similar to that in the first embodiment (FIGS. 3 to 5), and details of control (prioritizing control) differing from those in the first embodiment will be mainly described in the following. First, as is the case in the first embodiment, in the backup standby state, control is executed by the first control unit 41 and the second control unit 42 so that the output voltage of the second conversion unit 32A is higher than the output voltage of the first conversion unit 31A. In the backup standby state, the switching element 31B turns on by being controlled by the first control unit 41. The switching element 32B turns on, the switching element 32C turns off, and the switching element 33 turns off by being controlled by the second control unit 42.

In the backup control (FIGS. 3 to 5) by the backup control apparatus 1, the switching element 31B is kept in the on state once the backup operation (step S13) is started. The switching element 32B is kept in the on state. Furthermore, the switching element 32C is kept in the off state, and the switching element 33 is kept in the off state.

During the prioritizing control, the first control unit 41 controls the first conversion unit 31A so that a voltage based on the first power storage portion 71 is applied to the first conductive path 111, and the second control unit 42 controls the second conversion unit 32A so that a voltage based on the second power storage portion 72 is applied to the third conductive path 113. Furthermore, the first control unit 41 and the second control unit 42 control the first conversion unit 31A and the second conversion unit 32A so that the voltage of the third conductive path 113 is maintained at a voltage at which current flow from the first conductive path 111 to the third conductive path 113 is interrupted. For example, the cathode voltage of the diode 33A (voltage of the third conductive path 113) is controlled so as to have a greater value than the anode voltage of the diode 33A (voltage of the first conductive path 111). Furthermore, the switching element 31B and the switching element 32B remain on. Furthermore, the switching element 32C turns on by being controlled by the second control unit 42. The switching element 33 remains off. Thus, power is supplied to the load 93 selectively from only the second power storage portion 72. In such a manner, a state in which current flow from the first conductive path 111 to the third conductive path 113 is interrupted can be maintained by the first control unit 41 and the second control unit 42 mutually communicating.

Upon determining that the open-circuit voltage of the second power storage portion 72 is no higher than the cut-off voltage (Yes in step S21), the supply control using the second supply circuit 32 is stopped and supply control using the first supply circuit 31 is executed. Specifically, the switching element 31B remains on. The switching element 32B turns off, the switching element 32C turns off, and the switching element 33 turns on by being controlled by the second control unit 42. An interruption of power supply to the common load (load 93) can be prevented from occurring during a switch between power sources.

Fourth Embodiment

An on-board power supply system in a fourth embodiment has a configuration similar to that of the on-board power supply system in the third embodiment; some features of the backup control by the backup control apparatus 1 differ from those in the third embodiment, while the other features are similar. Note that the same reference symbol is provided to configurations that are the same as those in the third embodiment, and detailed description thereof is omitted.

As is the case in the third embodiment, the first control unit 41 and the second control unit 42 in the backup control apparatus 1 are capable of mutually communicating.

Control (prioritizing control) differing from the third embodiment in the backup control by the backup control apparatus 1 (FIGS. 3 to 5) will be mainly described in the following. First, as is the case in the third embodiment, in the backup standby state, control is executed by the first control unit 41 and the second control unit 42 so that the output voltage of the second conversion unit 32A is higher than the output voltage of the first conversion unit 31A. In the backup standby state, the switching element 31B turns on by being controlled by the first control unit 41. The switching element 32B turns on, the switching element 32C turns off, and the switching element 33 turns off by being controlled by the second control unit 42.

The backup operation (step S13) is started, and the switching element 31B turns off by being controlled by the first control unit 41. Thus, the flow of current from the first conversion unit 31A to the anode of the diode 33A is interrupted. The switching element 32B is kept in the on state. This allows current to flow from the second conversion unit 32A to the third-conductive-path-113-side. Furthermore, the switching element 32C is kept in the on state, and the switching element 33 is kept in the off state. By selectively placing the switching element 32B in the on state in such a manner, the backup control apparatus 1 applies a voltage based on the second power storage portion 72 to the third conductive path 113 via the second conductive path 112 (step S22).

Once the open-circuit voltage of the second power storage portion 72 equals or falls below the cut-off voltage (Yes in step S21), the switching element 31B is turned on by the first control unit 41 as a result of mutual communication between the first control unit 41 and the second control unit 42. This allows current to flow from the first conversion unit 31A to the anode of the diode 33A. The switching element 32B remains on. Furthermore, the switching element 32C turns off by being controlled by the second control unit 42. The switching element 33 remains off. This results in the higher one of the voltage applied to the switching element 33 or switching element 31B and the voltage applied to the switching element 32C being applied to the third conductive path 113. During the switch of the power source from the second power storage portion 72 to the first power storage portion 71, current flows to the third conductive path 113 via the diode 33A or the body diode of the switching element 32C.

Once the power source completely switches from the second power storage portion 72 to the first power storage portion 71 (step S23), the switching element 31B turns on by being controlled by the first control unit 41. This allows current to flow from the first conversion unit 31A to the anode of the diode 33A. The switching element 32B turns off by being controlled by the second control unit 42. Thus, the flow of current from the second conversion unit 32A to the third-conductive-path-113-side is interrupted. The switching element 33 is turned on by control by the second control unit 42. This allows current to flow from the first conversion unit 31A to the third-conductive-path-113-side. By selectively placing the switching element 31B in the on state in such a manner, the backup control apparatus 1 applies a voltage based on the first power storage portion 71 to the third conductive path 113 via the first conductive path 111. An interruption of power supply to the common load (load 93) can be prevented from occurring during a switch between power sources.

Fifth Embodiment

An on-board power supply system 400 in a fifth embodiment differs from the on-board power supply system in the fourth embodiment in that a switching element 433 is provided in place of the switching element 33, and is the same as the on-board power supply system in the fourth embodiment in other regards. Note that the same reference symbol is provided to configurations that are the same as those in the fourth embodiment, and detailed description thereof is omitted.

Figure 10:
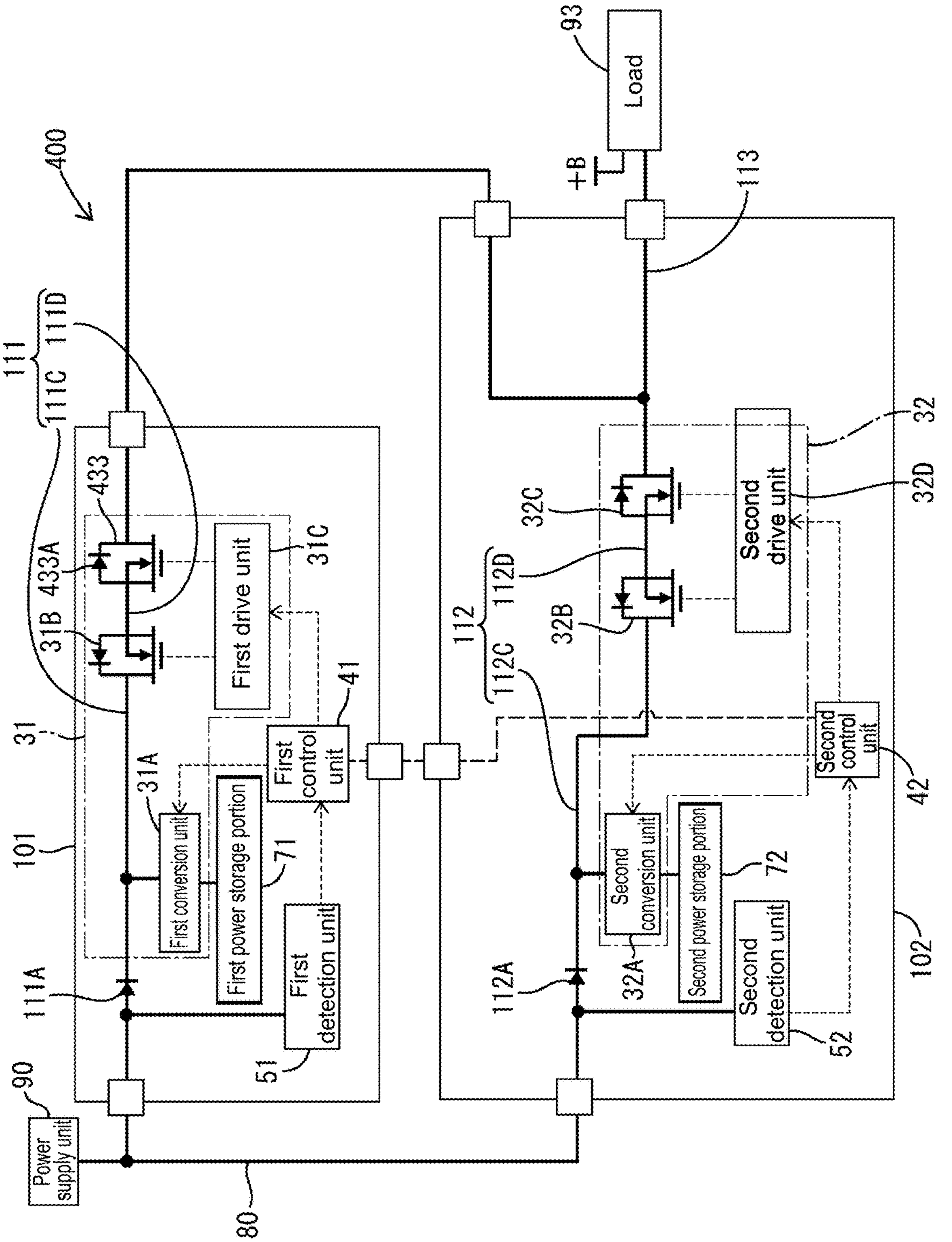
FIG. 10 is a block diagram schematically illustrating an example of an on-board power supply system including the on-board backup control apparatus in a fifth embodiment.

In the on-board power supply system 400, the backup control apparatus 1 (specifically the first power storage unit 101) includes the switching element 433 as illustrated in FIG. 10. The switching element 433 is provided between the first conductive path 111 and the third conductive path 113. The first conductive path 111 is provided between the diode 111A and the switching element 433. The third conductive path 113 is provided between the switching element 433, the switching element 32C, and the load 93.

For example, the switching element 433 is configured as an N-channel MOSFET. The source of the switching element 433 is electrically connected to one end (load-93-side end portion) of the first conductive path 111. The drain of the switching element 433 is electrically connected to the third conductive path 113. A diode 433A is the body diode (parasitic diode) of the switching element 433. The diode 433A is provided between the first conductive path 111 and the third conductive path 113. The anode of the diode 433A is electrically connected to the first-conductive-path 111 side. The cathode of the diode 433A is electrically connected to the third-conductive-path 113 side. The diode 433A (specifically, the switching element 433) may be mounted on a board to which the first supply circuit 31 is provided, may be mounted on a board to which the second supply circuit 32 is provided, or may be provided so as to be on the outside of the board to which the first supply circuit 31 is provided and the board to which the second supply circuit 32 is provided.

The backup control (FIGS. 3 to 5) by the backup control apparatus 1 is the same as that in the third embodiment. Specifically, the switching element 433 turns on and off at the same timings as the switching element 33 in the third embodiment. That is, the switching element 433 turns on at timings when the switching element 33 in the third embodiment turns on, and turns off at timings when the switching element 33 in the third embodiment turns off.

The on-board power supply system 400 in the fifth embodiment can achieve effects similar to those of the on-board power supply system in the fourth embodiment. In particular, when the backup operation (step S13) by the backup control apparatus 1 is started, the cathode voltage of the diode 433A (voltage of the third conductive path 113) is controlled so as to have a greater value than the anode voltage of the diode 33A (voltage of the first conductive path 111). Thus, power can be supplied to the load 93 selectively from only the second power storage portion 72.

Sixth Embodiment

An on-board power supply system 500 in a sixth embodiment includes a switch unit 533, and differs from the on-board power supply system in the first embodiment mainly in that power supplied to the load 93 is switched by the switch unit 533; otherwise, the on-board power supply system 500 is similar to the on-board power supply system in the first embodiment. Note that the same reference symbol is provided to configurations that are the same as those in the first embodiment, and detailed description thereof is omitted.

Figure 11:
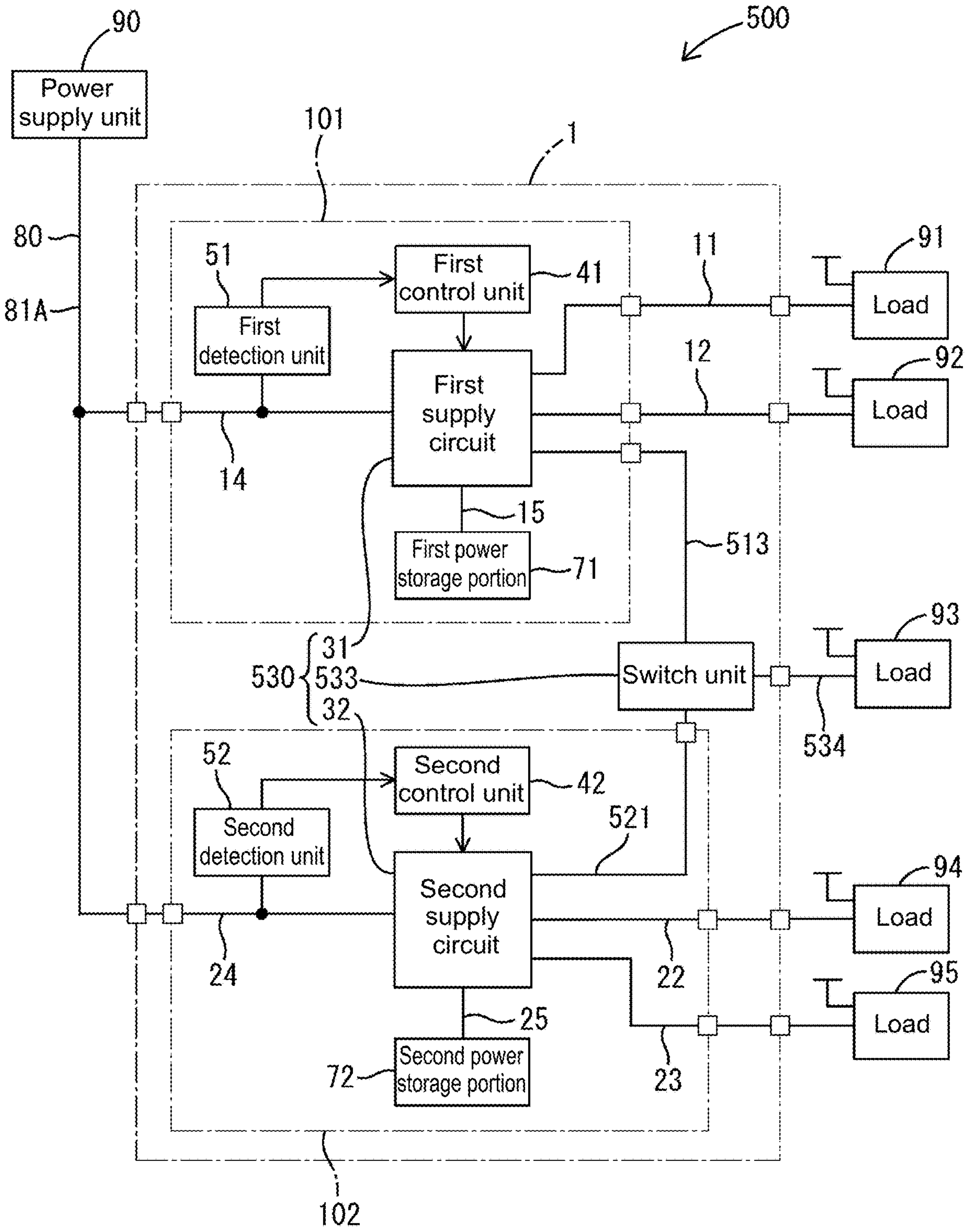
FIG. 11 is a block diagram schematically illustrating an example of an on-board power supply system including the on-board backup control apparatus in a sixth embodiment.

In the on-board power supply system 500, a supply circuit 530 of the backup control apparatus 1 includes the first supply circuit 31, the second supply circuit 32, and the switch unit 533 as illustrated in FIG. 11. The first supply circuit 31 functions so as to supply power to the switch unit 533. The first supply circuit 31 outputs power based on the first power storage portion 71 to the switch unit 533 via a first conductive path 511. The first conductive path 511 is a conductive path between the first supply circuit 31 and the switch unit 533.

The second supply circuit 32 functions so as to supply power to the switch unit 533. The second supply circuit 32 outputs power based on the second power storage portion 72 to the switch unit 533 via a second conductive path 512. The second conductive path 512 is a conductive path between the second supply circuit 32 and the switch unit 533. A conductive path 534 is a conductive path between the switch unit 533 and the load 93.

The switch unit 533 performs switching between a state in which power based on output from the first supply circuit 31 is supplied to the load 93 and a state in which power based on output from the second supply circuit 32 is supplied to the load 93. For example, the switch unit 533 includes a switch or the like. For example, the switch unit 533 operates by being controlled by the first control unit 41 and the second control unit 42.

Figure 12:
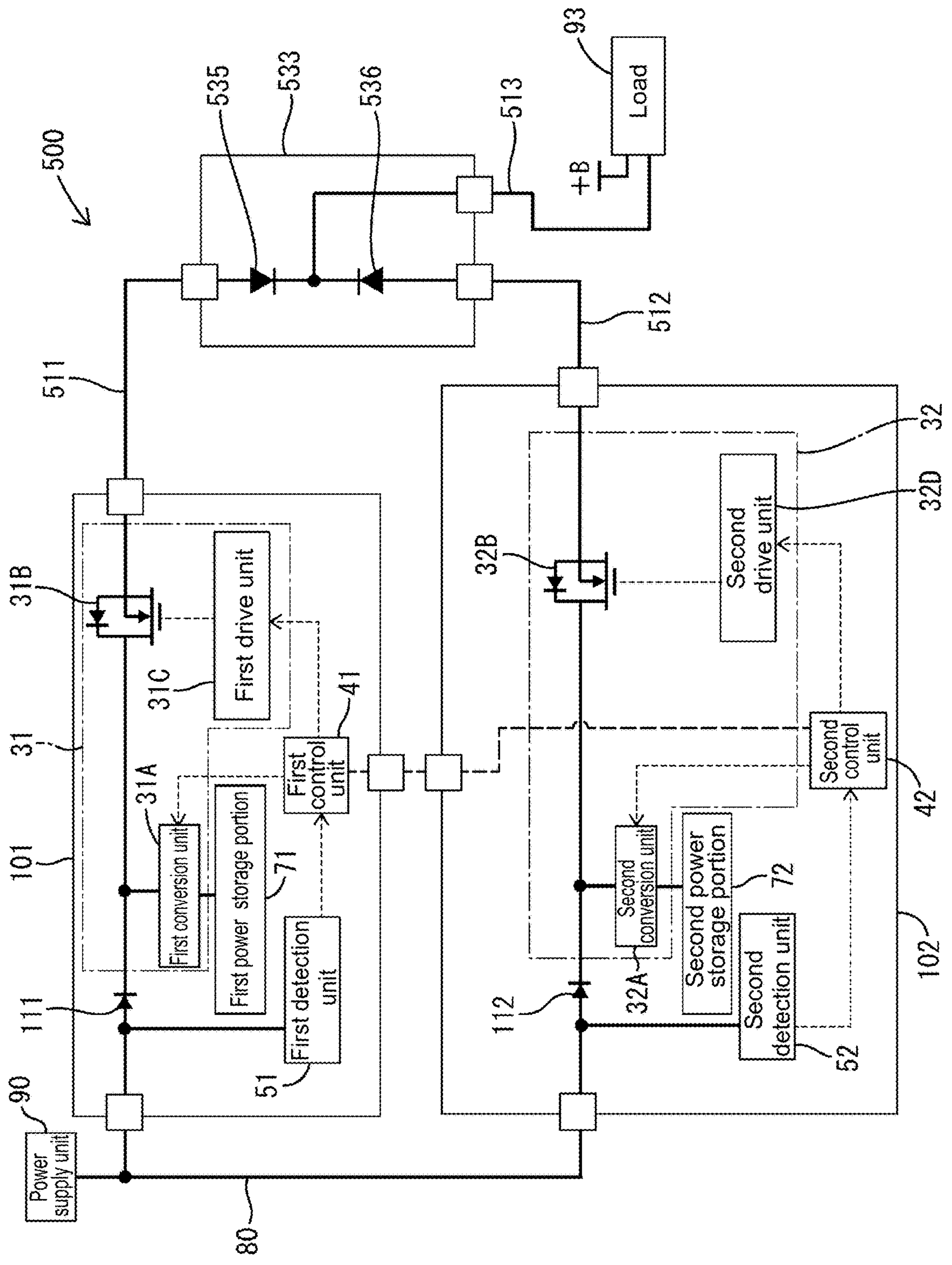
FIG. 12 is a block diagram illustrating in detail a part of the block diagram in FIG. 11.

FIG. 12 illustrates an example of a detailed configuration of the backup control apparatus 1. There is a difference from the first embodiment in that the first control unit 41 and the second control unit 42 are capable of mutually communicating. For example, the communication method of the communication between the first control unit 41 and the second control unit 42 is not limited, and may be Control Area Network (CAN) communication, Local Interconnect Network (LIN) communication, or the like. The switch unit 533 includes a diode 535 and a diode 536. The first conductive path 511 is provided between a diode 111A and the diode 535. The second conductive path 512 is provided between a diode 112A and the diode 536. The third conductive path 513 is provided between the diode 535, the diode 536, and the load 93.

The anode of the diode 535 is electrically connected to the other end (load-93-side end portion) of the first conductive path 511. The cathode of the diode 535 is electrically connected to the cathode of the diode 536 and one end (the power-supply-unit-90-side end portion) of the third conductive path 513. The anode of the diode 536 is electrically connected to the other end (load-93-side end portion) of the second conductive path 512. The load 93 is electrically connected to the other end of the third conductive path 513.

The backup control by the backup control apparatus 1 is similar to that in the first embodiment (FIGS. 3 to 5), and details of control (prioritizing control) differing from those in the first embodiment will be mainly described in the following. First, as is the case in the first embodiment, in the backup standby state, control is executed by the first control unit 41 and the second control unit 42 so that the output voltage of the second conversion unit 32A is higher than the output voltage of the first conversion unit 31A. In the backup standby state, the switching element 31B turns off by being controlled by the first control unit 41. The switching element 32B turns off by being controlled by the second control unit 42.

In the backup control (FIGS. 3 to 5) by the backup control apparatus 1, the switching element 31B turns on by being controlled by the first control unit 41 state once the backup operation (step S13) is started. The switching element 32B turns on by being controlled by the second control unit 42.

During the prioritizing control, the first control unit 41 and the second control unit 42 execute control so that the output voltage of the second conversion unit 32A is higher than the output voltage of the first conversion unit 31A. Specifically, the first conversion unit 31A and the second conversion unit 32A are controlled so that the voltage applied to the diode 536 (voltage of the second conductive path 512) has a higher value than the voltage applied to the diode 535 (voltage of the first conductive path 511). The switching element 31B and the switching element 32B are kept in the on state. Thus, power is supplied to the load 93 selectively from only the second power storage portion 72. In such a manner, a state in which current flow from the first conductive path 511 to the third conductive path 513 is interrupted can be maintained by the first control unit 41 and the second control unit 42 mutually communicating.

Upon determining that the open-circuit voltage of the second power storage portion 72 is no higher than the cut-off voltage (Yes in step S21), the supply control using the second supply circuit 32 is stopped and supply control using the first supply circuit 31 is executed. Specifically, the switching element 31B remains on. The switching element 32B turns off by being controlled by the second control unit 42. An interruption of power supply to the common load (load 93) can be prevented from occurring during a switch between power sources.

OTHER EMBODIMENTS

The present disclosure is not limited to the embodiments that have been described by way of the drawings and the description above. For example, features of the embodiments described up to this point and in the following can be combined in any way as long as there is no contradiction. Furthermore, the features of the embodiments described up to this point and in the following can also be omitted unless it is explicitly indicated that the features are essential. Furthermore, the above-described embodiments may be modified as follows.

In the first to third embodiments described above, the diode 33A is configured as the body diode (parasitic diode) of the switching element 33; however, the diode 33A may be configured as a conventional forward-biased diode. This similarly applies to the diode 433A in the fifth embodiments described above.

In the embodiments described above, in the backup control by the backup control apparatus 1, a state in which the voltage of the conductive path 14 is lower than a threshold is described as an example of the predetermined external state in step S12; however, the predetermined state may be a different state. For example, the predetermined external state may be a state in which a request for the backup operation has been received from a load (specifically, a state in which at least one of the first control unit 41 and the second control unit 42 has received a signal requesting the backup operation from a load).

In the embodiments described above, the output voltage of the second conversion unit 32A is made higher than the output voltage of the first conversion unit 31A during the backup control (prioritizing control) by the backup control apparatus 1; however, control by either the first conversion unit 31A or the second conversion unit 32A may be stopped during the backup control (prioritizing control). The phrase "controlling the first and second conversion units" in the present disclosure also encompasses a case in which the operation of either the first conversion unit 31A or the second conversion unit 32A is stopped by stopping control by the first control unit 41 or the second control unit 42.

In the first to fifth embodiments described above, configurations in which the load 93 is electrically connected to the second power storage unit 102 are disclosed; however, a configuration may be adopted in which the load 93 is electrically connected to the first power storage unit 101. In this case, a configuration would be obtained in which power from the second power storage unit 102 is supplied to the first power storage unit 101, and the first power storage unit 101 switches the power source of the load 93 (configuration similar to the second power storage unit 102 in the first to fourth embodiments described above).

In the embodiments described above, the restricting control (step S23) is executed in accordance with the predetermined state until the cumulative operation time reaches the predefined time (until Yes in step S31); however, control may be executed such that power is not supplied to the load 93 until the cumulative operation time reaches the predefined time.

In the embodiments described above, the restricting control (step S23) is executed in accordance with the predetermined state until the cumulative operation time reaches the predefined time (until Yes in step S31); however, the prioritizing control may be executed such that the above-described restricting control is executed until a certain time elapses from the occurrence of the external state (or the start of the backup operation), or control may be executed such that power is not supplied to the load 93 until a certain time elapses from the occurrence of the external state (or the start of the backup operation).

In the embodiments described above, a configuration may be adopted such that the operations of the loads 94 and 95 are not restricted, and the prioritizing control is executed with respect to the load 93 such that the total power consumption is suppressed to within a predetermined range.

In regard to the startup switch of the vehicle described in the embodiments described above, the startup switch may be an ignition switch. Alternatively, the startup switch may be a power switch for starting up an EV system in the case of an electric vehicle or the like.

In the embodiments described above, the power supply unit is a lead battery; however, there is no limitation to a lead battery. For example, the power supply unit may be a battery of another type such as a lithium-ion battery, or a power supply such as an alternator or a converter.

In the embodiments described above, the power storage portions are electric double-layer capacitors; however, the power storage portions are not limited to electric double-layer capacitors. The power storage portions may be power storage portions of another type, such as lithium-ion capacitors or lithium-ion batteries.

In the embodiments described above, the backup control apparatus performs the backup operation if power supply from the power supply unit ceases; however, the backup control apparatus may perform the backup operation such that power is supplied from the power storage portions in a predetermined state in which power supply has not completely ceased.

Note that it is to be understood that the embodiments disclosed herein are illustrative and are not restrictive in all respects. The scope of the present disclosure is not limited to the embodiments disclosed herein, and is intended to include all modifications that are within the scope of the claims and within the range of equivalents of the claims.

The invention claimed is:

1. An on-board backup control apparatus disposed in an on-board power supply system configured to provide power to common load including a high priority load and a low priority load, the on-board power supply system having a power supply unit, a first power storage portion and a second power storage portion, the on-board backup control apparatus performing a backup operation of supplying power to the common load from at least one of the first power storage portion and the second power storage portion when a power supply from the power supply unit to the loads has been interrupted or has decreased, the on-board backup control apparatus comprising:

a first supply circuit connected to a common load via a first conductive path, the first supply circuit configured to output power from the first power storage to the common load;

a second supply circuit connected to the common load via a second conductive path, the second supply circuit configured to output power from the second power storage portion to the common load; and a control unit that causes the first and second supply circuits to perform the backup operation when the power supply from the power supply unit to the loads has been interrupted or has decreased, wherein the second supply circuit supplies power from the second power storage portion to at least one of the high priority load and the low priority load, and when the power supply from the power supply unit to the common load has been interrupted or has decreased, the control unit executes predetermined prioritizing control for prioritizing a first backup operation of supplying power from the second power storage portion to the prioritized load over a second backup operation of supplying power from the second power storage portion to the non-prioritized load.

2. The on-board backup control apparatus according to claim 1 further including:

a third conductive path connecting the first and second conductive paths together and to the common load so as to provide power to the common load from the first and second power supply circuits, wherein the first supply circuit comprises a first switching element that is provided on the first conductive path, the first switching element configured to be turned on and off wherein when the first switching element is on, current flows from the first-power-storage-portion side to the third-conductive-path side and when the first switching element is off, the flow of current from the first-power-storage-portion side to the third-conductive-path side is stopped, the second supply circuit comprises a second switching element that is provided on the second conductive path, the second switching element configured to be turned on and off wherein when the first switching element is on current flows from the second-power-storage-portion side to the third-conductive-path side in an on state and when the first switching element is off the flow of current from the second-power-storage-portion side to the third-conductive-path side is stopped, the control unit comprises a first control unit and a second control unit that respectively control the first supply circuit and the second supply circuit, the first and second control units are configured to communicate with each other via a vehicle network protocol, and during the second backup operation, a voltage from the second power storage portion is applied to the third conductive path via the second conductive path by the second control unit placing the second switching element in the on state while the first control unit places the first switching element in the off state, and, during the first backup operation, a voltage from the first power storage portion is applied to the third conductive path via the first conductive path by the second control unit placing the second switching element in the off state while the first control unit places the first switching element in the on state.

3. The on-board backup control apparatus according to claim 1 further including:

a third conductive path connecting the second conductive path to the common load; and a diode that is provided between the first and third conductive paths, an anode and a cathode of the diode being electrically connected to the first-conductive-path side and the third-conductive-path side, respectively, wherein the first supply circuit comprises a first conversion unit configured to boost or steps-down an input voltage that from the power supplied by the first power storage portion and applies an output voltage to the first conductive path, the second supply circuit comprises a second conversion unit that boosts or steps-down an input voltage that is based on power from the second power storage portion and applies an output voltage to the second conductive path, and during the prioritizing control, the control unit controls output to the first conductive path by the first conversion unit and output to the second conductive path by the second conversion unit so that power based on the second power storage portion is supplied to the third conductive path via the second conductive path and power based on the first power storage portion is interrupted by the diode.

4. The on-board backup control apparatus according to claim 3 further including:

a first voltage detection unit configured to detect a voltage of the first conductive path; and a second voltage detection unit configured to detect a voltage of the third conductive path, wherein, during the prioritizing control, the control unit is configured to actuate the first conversion unit wherein a voltage from the first power storage portion is applied to the first conductive path, actuates the second conversion unit wherein a voltage from the second power storage portion is applied to the third conductive path, and processes the voltage detection results by the first and second voltage detection units to actuate the first conversion unit and the second conversion unit so that the voltage of the third conductive path is maintained at a voltage at which current flow from the first conductive path to the third conductive path is interrupted.

5. The on-board backup control apparatus according to claim 3 further including:

a current detection unit configured to detect a current flowing in the first conductive path, wherein, during the prioritizing control, the control unit is configured to actuate the first conversion unit so that a voltage from the first power storage portion is applied to the first conductive path, actuate the second conversion unit so that a voltage from the second power storage portion is applied to the third conductive path, and processes a detection result by the current detection unit to actuate the first conversion unit and the second conversion unit so that current flowing from the first conductive path toward the diode becomes close to zero or below zero.

6. The on-board backup control apparatus according to claim 3, wherein the control unit includes a first control unit and a second control unit that respectively control the first supply circuit and the second supply circuit, the first and second control units are configured to communicate with each other via a vehicle network protocol, and during the prioritizing control, the first control unit is configured to actuate the first conversion unit so that a voltage from the first power storage portion is applied to the first conductive path, the second control unit is configured to actuate the second conversion unit so that a voltage from the second power storage portion is applied to the third conductive path, and the first and second control units are configured to actuate the first and second conversion units so that a voltage of the third conductive path is maintained at a voltage at which current flow from the first conductive path to the third conductive path is interrupted.

7. The on-board backup control apparatus according to claim 1, wherein the prioritizing control includes restricting control for stopping the supply of power based on the second power storage portion to the second load once the second power storage portion enters a predetermined state, and the control unit executes the restricting control in accordance with the predetermined state until an elapsed time during which the first load has been continuously supplied power from the second power storage portion during the first backup operation reaches a predefined time, wherein the predefined time is set based on power consumed by a single operation of the first load and a number of times the first load is scheduled to operate.

8. The on-board backup control apparatus according to claim 7, wherein the predetermined state is a state in which an open-circuit voltage of the second power storage portion equal to or below a cut-off voltage set.

9. The on-board backup control apparatus according to claim 2, wherein the prioritizing control includes restricting control for stopping the supply of power based on the second power storage portion to the second load once the second power storage portion enters a predetermined state, and the control unit executes the restricting control in accordance with the predetermined state until an elapsed time during which the first load has been continuously supplied power from the second power storage portion during the first backup operation reaches a predefined time, wherein the predefined time is set based on power consumed by a single operation of the first load and a number of times the first load is scheduled to operate.

10. The on-board backup control apparatus according to claim 3, wherein the prioritizing control includes restricting control for stopping the supply of power based on the second power storage portion to the second load once the second power storage portion enters a predetermined state, and the control unit executes the restricting control in accordance with the predetermined state until an elapsed time during which the first load has been continuously supplied power from the second power storage portion during the first backup operation reaches a predefined time, wherein the predefined time is set based on power consumed by a single operation of the first load and a number of times the first load is scheduled to operate.

11. The on-board backup control apparatus according to claim 4, wherein the prioritizing control includes restricting control for stopping the supply of power based on the second power storage portion to the second load once the second power storage portion enters a predetermined state, and the control unit executes the restricting control in accordance with the predetermined state until an elapsed time during which the first load has been continuously supplied power from the second power storage portion during the first backup operation reaches a predefined time, wherein the predefined time is set based on power consumed by a single operation of the first load and a number of times the first load is scheduled to operate.

12. The on-board backup control apparatus according to claim 5, wherein the prioritizing control includes restricting control for stopping the supply of power based on the second power storage portion to the second load once the second power storage portion enters a predetermined state, and the control unit executes the restricting control in accordance with the predetermined state until an elapsed time during which the first load has been continuously supplied power from the second power storage portion during the first backup operation reaches a predefined time, wherein the predefined time is set based on power consumed by a single operation of the first load and a number of times the first load is scheduled to operate.

13. The on-board backup control apparatus according to claim 6, wherein the prioritizing control includes restricting control for stopping the supply of power based on the second power storage portion to the second load once the second power storage portion enters a predetermined state, and the control unit executes the restricting control in accordance with the predetermined state until an elapsed time during which the first load has been continuously supplied power from the second power storage portion during the first backup operation reaches a predefined time, wherein the predefined time is set based on power consumed by a single operation of the first load and a number of times the first load is scheduled to operate.

* * * * *